(12) United States Patent
Bhosale et al.

(10) Patent No.: US 11,964,522 B2
(45) Date of Patent: Apr. 23, 2024

(54) IMPLEMENT ATTACHMENT ASSEMBLY AND METHOD OF USE

(71) Applicant: Deere & Company, Moline, IL (US)

(72) Inventors: Digvijay A. Bhosale, Pune (IN); Benjamin J. Heimbuch, Cedar Falls, IA (US); Dennis A. Bowman, Denver, IA (US); Jacob J. Foxen, Parkersburg, IA (US); Grant M. Ubben, Parkersburg, IA (US)

(73) Assignee: Deere & Company, Moline, IL (US)

( * ) Notice: Subject to any disclaimer, the term of this patent is extended or adjusted under 35 U.S.C. 154(b) by 485 days.

(21) Appl. No.: 17/201,701

(22) Filed: Mar. 15, 2021

(65) Prior Publication Data
US 2022/0288982 A1 Sep. 15, 2022

(51) Int. Cl.
*B60D 1/02* (2006.01)
*B60D 1/18* (2006.01)
*B60D 1/28* (2006.01)
*B60K 17/28* (2006.01)
*B60D 1/00* (2006.01)

(52) U.S. Cl.
CPC .......... *B60D 1/025* (2013.01); *B60D 1/187* (2013.01); *B60D 1/28* (2013.01); *B60K 17/28* (2013.01); *B60D 2001/008* (2013.01)

(58) Field of Classification Search
CPC . B60D 1/025; B60D 1/02; B60D 1/28; B60D 1/187; B60D 1/145; B60D 2001/008; B60K 17/28; Y10S 56/14; A01B 71/06; A01B 71/063; A01B 71/066
USPC ......... 180/53.1, 53.2, 53.3, 53.4, 53.5, 53.6, 180/53.61, 53.62, 53.7, 53.8; 280/515, 280/504

See application file for complete search history.

(56) References Cited

U.S. PATENT DOCUMENTS

| | | | |
|---|---|---|---|
| 4,257,621 A | 3/1981 | Adams et al. | |
| 5,386,680 A | 2/1995 | Friesen | |
| 6,718,747 B2 | 4/2004 | Friesen | |
| 6,758,486 B1 | 7/2004 | Kollath | |
| 7,416,206 B2 | 8/2008 | Buerkle | |

(Continued)

FOREIGN PATENT DOCUMENTS

| | | |
|---|---|---|
| DE | 10030263 A1 | 1/2002 |
| DE | 102016123983 A1 | 6/2018 |

(Continued)

OTHER PUBLICATIONS

German Search Report issued in application No. DE102022201191.0, dated Oct. 24, 2022, 12 pages.

*Primary Examiner* — Keith J Frisby
(74) *Attorney, Agent, or Firm* — Tucker Ellis LLP; Michael G. Craig; Heather M. Barnes

(57) ABSTRACT

Techniques and/or systems are disclosed for an implement attachment assembly for a work vehicle. The implement attachment assembly includes a member having a body extending longitudinally between a first end and a second end. The first end includes a central axis disposed at a first height relative to a member vertical axis and the second end includes a central axis disposed at a second height relative to the member vertical axis. The first end central axis is operably disposed at a different height than the second end central axis. The first end is configured to operably connect to the work vehicle. The second end is configured to operably connect to a coupling device.

19 Claims, 14 Drawing Sheets

(56) References Cited

U.S. PATENT DOCUMENTS

| | | | |
|---|---|---|---|
| 7,478,823 B2 | 1/2009 | Doubet et al. | |
| 7,516,975 B2 | 4/2009 | Lair et al. | |
| 7,530,592 B2 | 5/2009 | Heitlinger et al. | |
| 7,625,003 B2 | 12/2009 | Tveito et al. | |
| 9,480,198 B2 | 11/2016 | Treffer et al. | |
| 10,029,523 B2 | 7/2018 | Pederson | |
| 10,179,488 B2 | 1/2019 | Hruska et al. | |
| 10,618,362 B2 | 4/2020 | Faust et al. | |
| 2010/0327144 A1* | 12/2010 | Steffensen | B60K 17/28 248/674 |
| 2018/0208056 A1* | 7/2018 | Kraus | B60K 17/28 |
| 2019/0293506 A1* | 9/2019 | Brütt | G01L 5/1627 |
| 2020/0254834 A1* | 8/2020 | Rasset | B60D 1/025 |
| 2021/0267113 A1* | 9/2021 | Malone | B60D 1/02 |

FOREIGN PATENT DOCUMENTS

| | | | |
|---|---|---|---|
| DE | 102018204285 A1 * | 9/2019 | |
| GB | 564625 | 10/1944 | |
| GB | 738559 | 10/1955 | |
| WO | WO2020/023894 A1 | 1/2020 | |

* cited by examiner

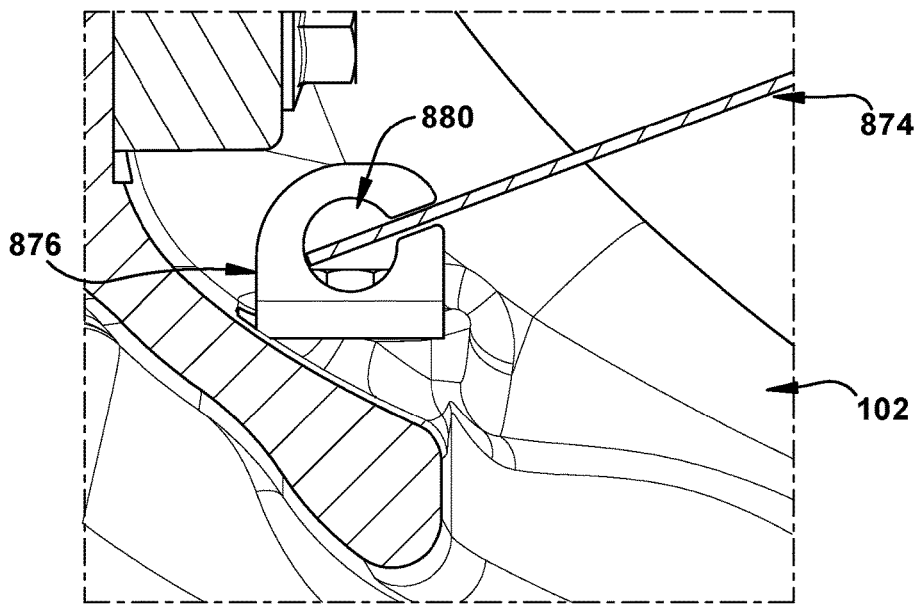
FIG. 9A
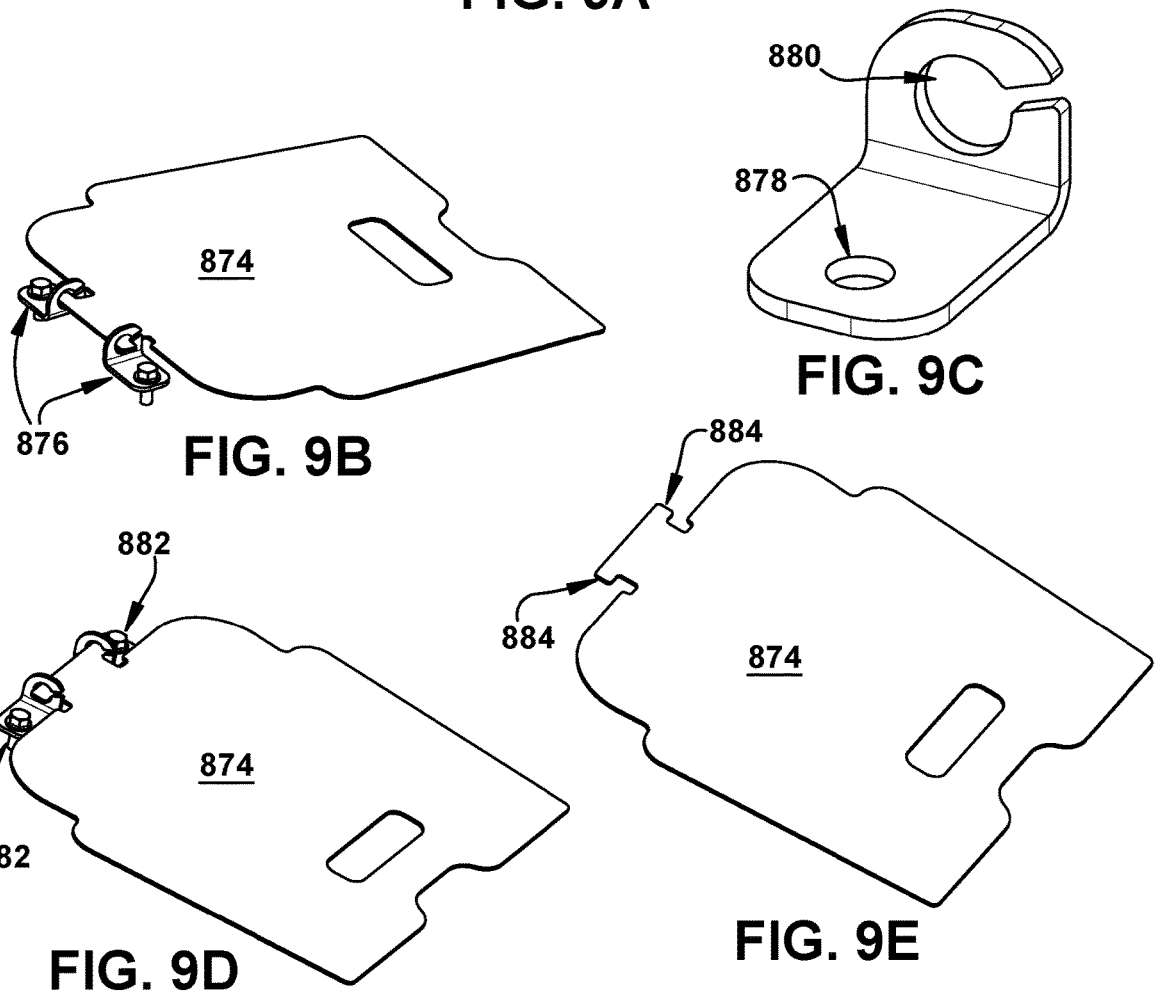
FIG. 9B
FIG. 9C
FIG. 9D
FIG. 9E

IMPLEMENT ATTACHMENT ASSEMBLY AND METHOD OF USE

BACKGROUND

Heavy draft tractors can be implemented with an assembly for pulling big implements. Typically, a heavy draft tractor used for pulling a big implement is fitted with a drawbar assembly that permits swing and different row spacing adjustments. The assembly generally includes a simple bar, serving as the drawbar, which is attached at the front support and chassis by a front pin and the drawbar is supported on the rear support of a drawbar support mechanism. This traditional drawbar design permits swing movement and allows locking of the drawbar on the left or right side of a tractor to facilitate different row spacing.

In larger tractor models, drawbar swing and different row spacing adjustment requirements may not be as important. Moreover, swing in articulating tractors may not be as important because application of interseeding rows is not common on this type of tractor, and because of the dynamics of how the tractor turns.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, there is provided an implement attachment assembly for a work vehicle, the implement attachment assembly comprising a member having a body extending longitudinally between a first end and a second end. The first end comprises a central axis disposed at a first height $h_1$ relative to a member vertical axis and the second end comprises a central axis disposed at a second height $h_2$ relative to the member vertical axis, wherein the first end central axis is operably disposed at a different height than the second end central axis. The first end is configured to operably connect to the work vehicle and the second end is configured to operably connect to a coupling device.

In another implementation, there is provided an implement attachment assembly for a work vehicle, the implement attachment assembly comprising a member having a hollow body that extends longitudinally between a first end and a second end. The first end comprises a central axis disposed at a first height $h_1$ relative to a member vertical axis and the second end comprises a central axis disposed at a second height $h_2$ relative to the member vertical axis, wherein the first height $h_1$ is greater than the second height $h_2$. The body has a downward sloping curved surface moving in a longitudinal direction from the first end to the second end. The first end is configured to operably connect to the work vehicle. The second end is configured to operably connect to a coupling device.

In yet another implementation, there is provided an implement attachment assembly for a work vehicle, the implement attachment assembly comprising a member having a hollow body that extends longitudinally between a first end and a second end. The first end comprises a central axis disposed at a first height $h_1$ relative to a member vertical axis and the second end comprises a central axis disposed at a second height $h_2$ relative to the member vertical axis, wherein the first end central axis is operably disposed at a different height than the second end central axis. The member operably accommodates a PTO shaft assembly that is operably coupled with a PTO clutch assembly. The first end is configured to operably connect to the work vehicle and the second end is configured to operably connect to a coupling device.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIGS. 9A through 9E are component diagrams illustrating an example implementation of one or more portions of one or more systems described herein, in accordance with this disclosure.

DETAILED DESCRIPTION

Figure 1:
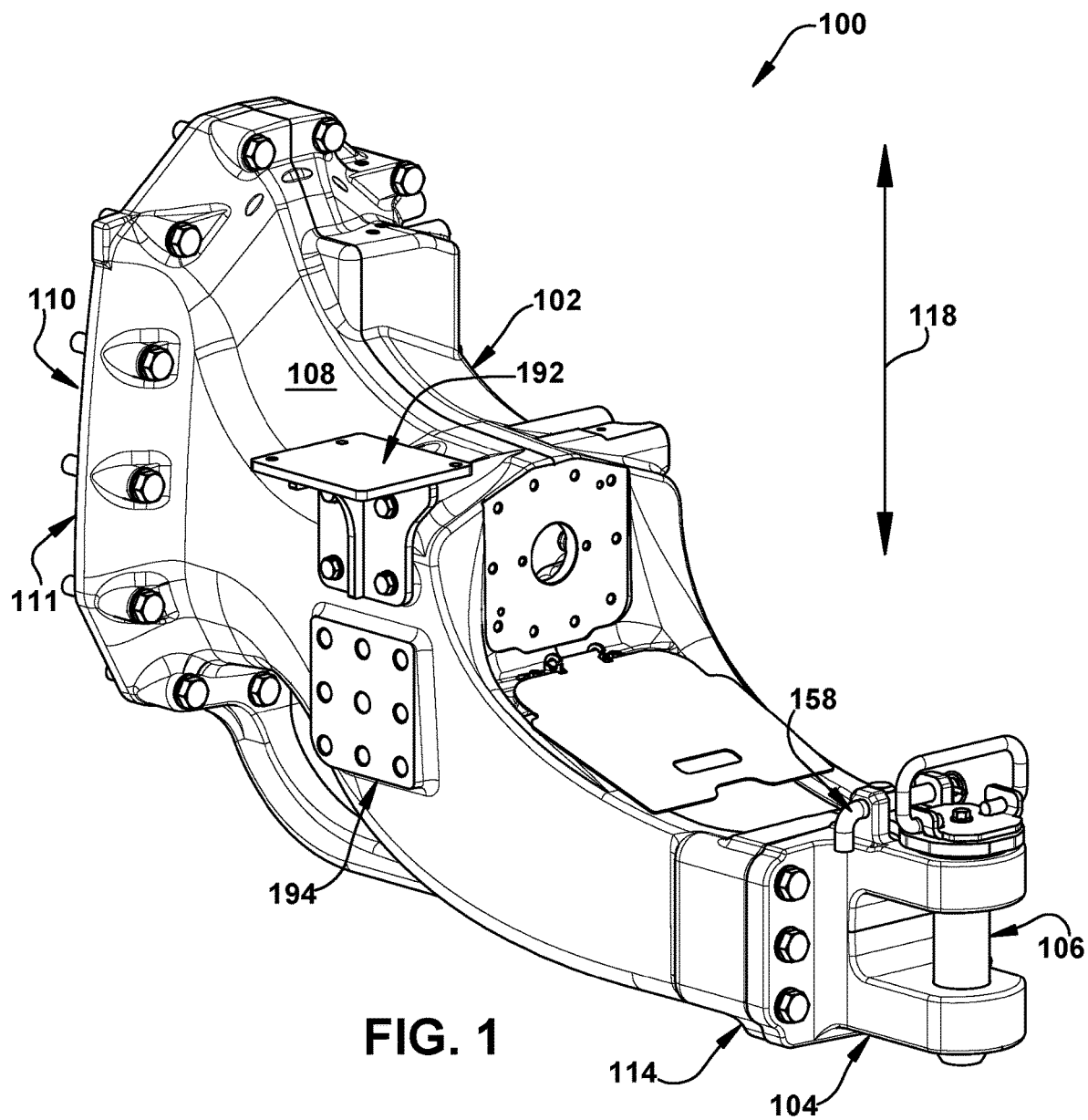
FIG. 1 is a component diagram illustrating an implement attachment assembly in accordance with this disclosure.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

Figure 2:
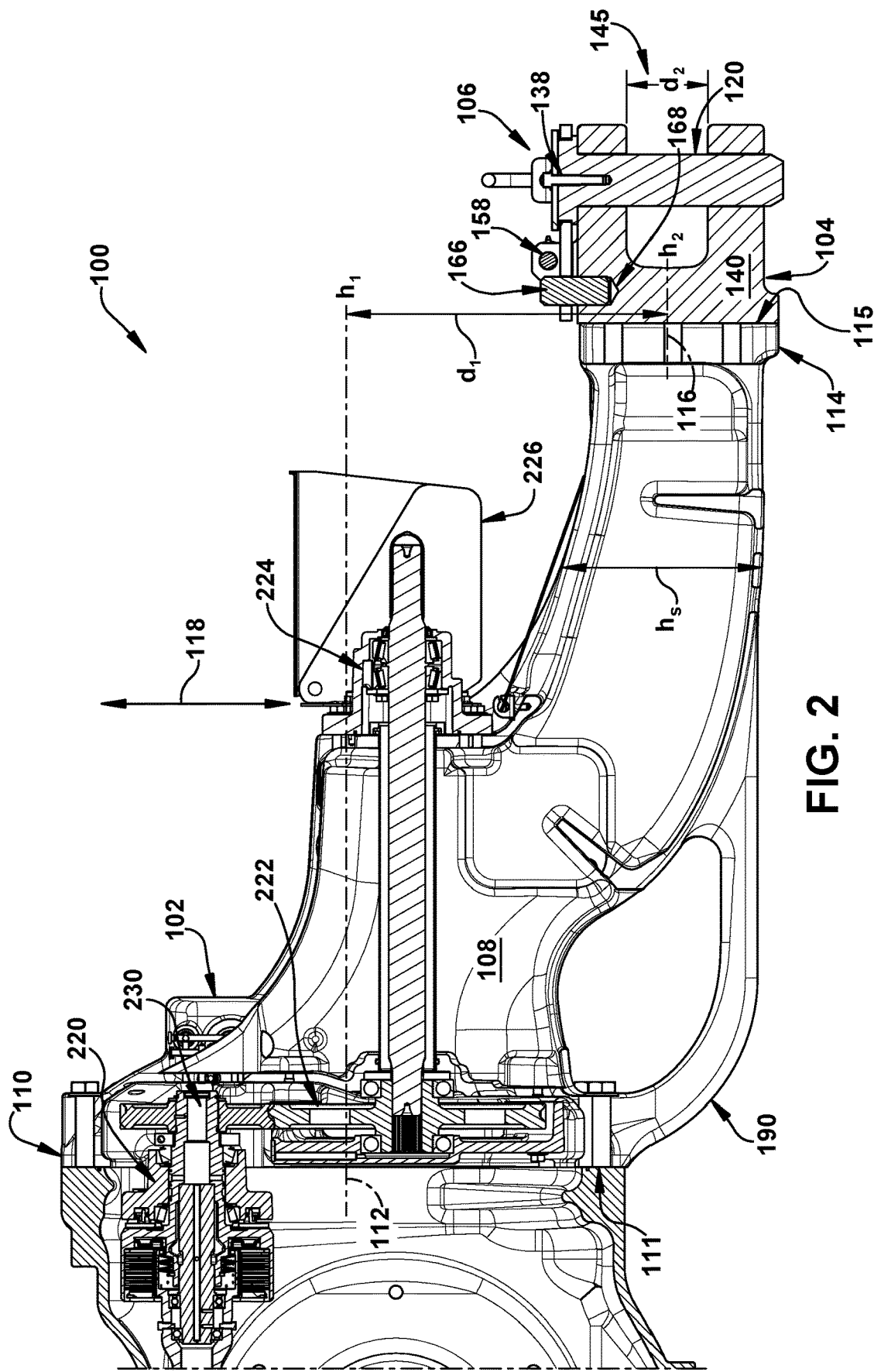
FIG. 2 is a component diagram illustrating a cross-sectional view of an implement attachment assembly in accordance with this disclosure.

Referring now to the drawings, FIGS. 1 and 2 are component diagrams illustrating an implement attachment assembly 100 for use with a work vehicle in accordance with this disclosure. The implement attachment assembly comprises a member 102 configured to operably connect to a coupling device 104. The coupling device 104 is configured to receive a pin 106.

The member 102 comprises a body 108 that extends longitudinally between a first end 110 and a second end 114. The first end 110 comprises a central axis 112 and the second end 114 comprises a central axis 116. The first end 110 can be vertically offset relative to the second end 114 such that the first end central axis 112 and the second end central axis 116 are operably disposed at different heights relative to a member vertical axis 118.

In some implementations, the member 102 can comprise a first end 110 comprising a central axis 112 disposed at a first height $h_1$ relative to the member vertical axis 118 and a second end 114 comprising a central axis 116 disposed at a second height $h_2$ relative to the member vertical axis 118, wherein the first end central axis 112 is operably disposed at a different height than the second end central axis 116. In this implementation, the first height $h_1$ and the second height $h_2$ are nonequivalent and are vertically offset from one another relative to the member vertical axis 118. As an example, the distance $d_1$ between the first height $h_1$ and the second height $h_2$, measured with respect to the member vertical axis 118, is the offset.

In some implementations, such as when the first height $h_1$ and the second height $h_2$ are nonequivalent, the member 102 can comprise a body 108 with a sloped (e.g., angled) or curved surface moving in a longitudinal direction from the first end 110 to the second end 114. In the implementations shown in FIGS. 1 and 2, the first height $h_1$ is greater than the second height $h_2$ (e.g., relative to the bottom of the member 102, such as when the member 102 is operably disposed on a vehicle) and the slope of the body 108 tends to decline (e.g., slopes downward) moving in the longitudinal direction from the first end 110 to the second end 114. The downward slope of the body 108 can be non-linear resulting in the body 108 having a surface that is curved, as opposed to linear and angled, moving in a longitudinal direction from the first end 110 to the second end 114. The member 102 shown in FIGS. 1 and 2 comprises a body 108 with a downward sloping curved surface moving in a longitudinal direction from the first end 110 to the second end 114.

The first end 110 can comprise a first interface 111 and the second end 114 can comprise a second interface 115. The first interface 111 can comprise a surface at the first end 110 of the member 102 that is configured to engage with the work vehicle when the member 102 is operably connected to the work vehicle. The second interface 115 can comprise a surface at the second end 114 of the member 102 that is configured to engage the coupling device 104 when the member 102 is operably connected to the coupling device 104.

FIG. 2 is a component diagram depicting a cross-sectional view of the implement attachment assembly 100 of FIG. 1. The cross-sectional height $h_s$ of the member 102, measured between the bottom and top of the body 108, can vary moving in a longitudinal direction from the first end 110 to the second end 114. In some implementations, the height $h_s$ of the member 102 can generally become smaller in size moving in a longitudinal direction from the first end 110 to the second end 114. The greater cross-sectional height $h_s$ of the member 102 proximate the first end 110 can, in some instances, provide extra space within the member 102 to accommodate and house components. As an example, a PTO shaft assembly 222 can be operably coupled with a PTO clutch assembly 220 in a half of the member 102 proximate the first end 110 because this half generally provides more internal space in the member 102 for PTO components and may offer closer proximity to electrical connections and potential power sources disposed on a work vehicle.

In some implementations, the member 102 operably accommodates a power take-off (PTO) shaft assembly 222 that is operably coupled with a PTO clutch assembly 220. In these implementations, the PTO clutch assembly 220 can comprise a PTO coupler 230 that operably extends into the body 108 of the member 102 at the first end 110 to interface with the PTO shaft assembly 222. The PTO shaft assembly 222 can extend vertically within the body 108 in a direction parallel to the member vertical axis 118. It should be noted the PTO clutch assembly 220 and PTO shaft assembly 222 are optional features of the implement attachment assembly 100 and, in particular, the member 102. However, when the PTO clutch assembly 220 and PTO shaft assembly 222 are housed within the member 102, a rear PTO casting 224 can be mounted to the member body 108 with fasteners, such as bolts, and a PTO shield 226 can be mounted on the rear PTO casting 224. The PTO shield 226 at least partially (preferably completely) covers the PTO components protruding from the member body 108 to mitigate potential damage to the PTO components, such as by contact with a foreign object and/or exposure to the environment.

In some implementations, the member 102 optionally comprises a tie-down 190. The tie-down 190 comprises a body, a portion of which can be formed as a loop shape, or the like, that is fixedly engaged at the bottom of the member 102. As an example, the tie-down 190 can comprise two ends with one end connected to the bottom of the member 102 proximate the first end 110 and the other end connected to the bottom of the member 102 proximate the second end 114 to form a loop underneath the member 102. For example, the loop shape can be used for attaching an implement, such as using a chain, during use. In some implementations, the tie-down 190 generally comprises one loop arranged on the center line of a work vehicle such as, for example, a tractor. In alternative implementations, the tie-down 190 can comprise two or more loops respectively fixed to the member 102.

In some implementations, the member 102 can comprise a hollow body 108. As an example, the hollow body 108 can be formed using suitable means, such as being formed by casting, machining, extruding, or other processes for forming the member 102. As an example, the hollow body 108 may be able to reduce the weight of the member 102 over a similar member that does not have a hollow body 108. The member 102 can assume a variety of shapes and sizes. In some implementations, the member 102 comprises a tubular or cylindrical body 108 with first and second ends 110 and 114 that are generally circular, oval, or elliptical in shape. However, the member 102 is not so limited and can comprise a body 108, as well as a first end 110 and second end 114, that assume other shapes.

Figure 11A:
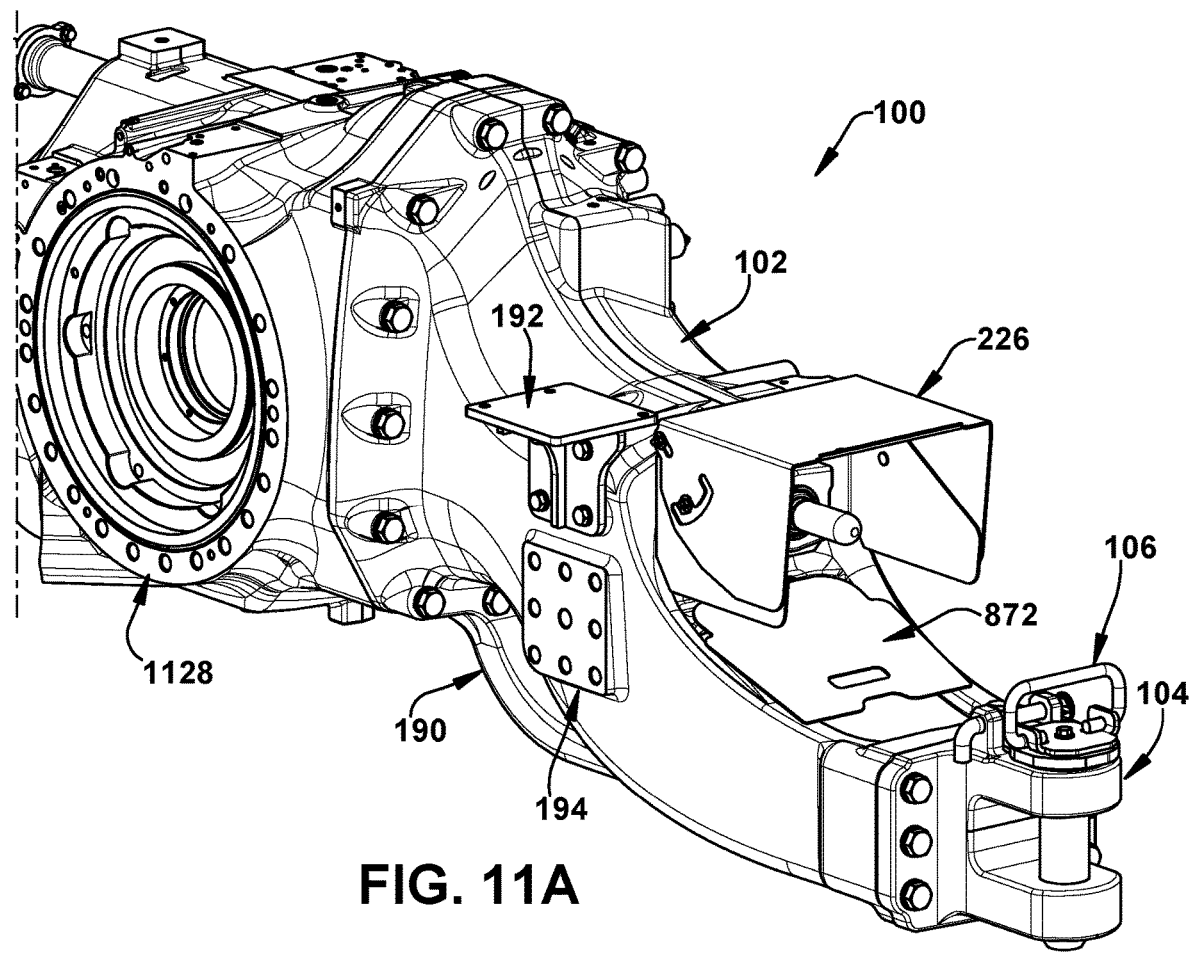
FIGS. 11A and 11B are component diagrams illustrating an example implementation of one or more portions of an implement attachment assembly in accordance with this disclosure.
Figure 11B:
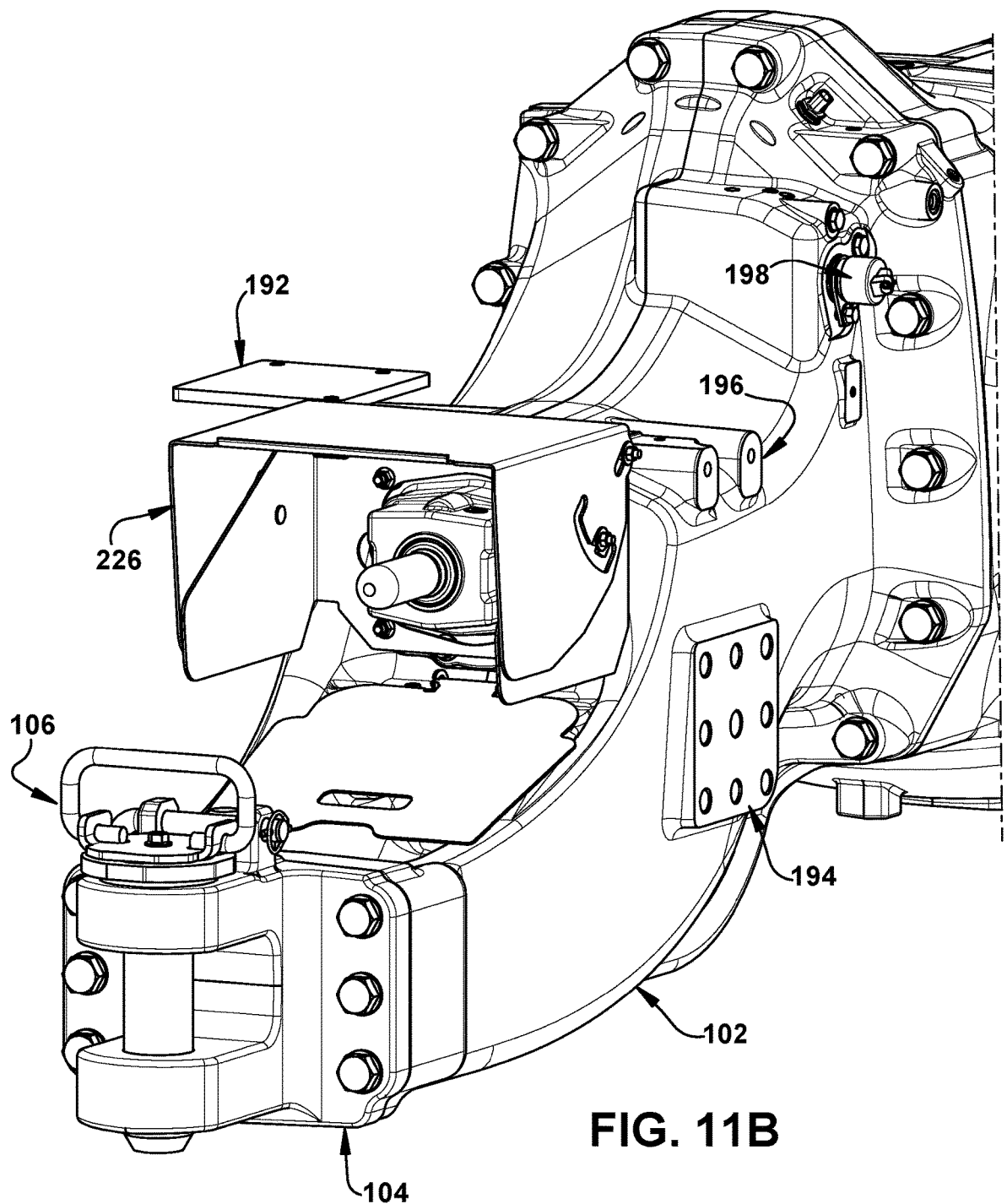

In use, the first end 110 of the member 102 can be configured to operably connect to a work vehicle such as, for example, to the rear of the work vehicle. In some implementations, the member 102 can be operably fastened to the work vehicle at the first end 110 using any suitable fastening means such as, for example, bolts. In some implementations, the member 102 is operably fastened to the rear of a work vehicle by bolting the first end 110 to a differential case 1128 on the work vehicle, as shown in FIGS. 11A and 11B. In some implementations, the second end 114 of the member 102 can be configured to operably connect to a coupling device 104, such as a clevis, as will be described in more detail below.

Figure 10:
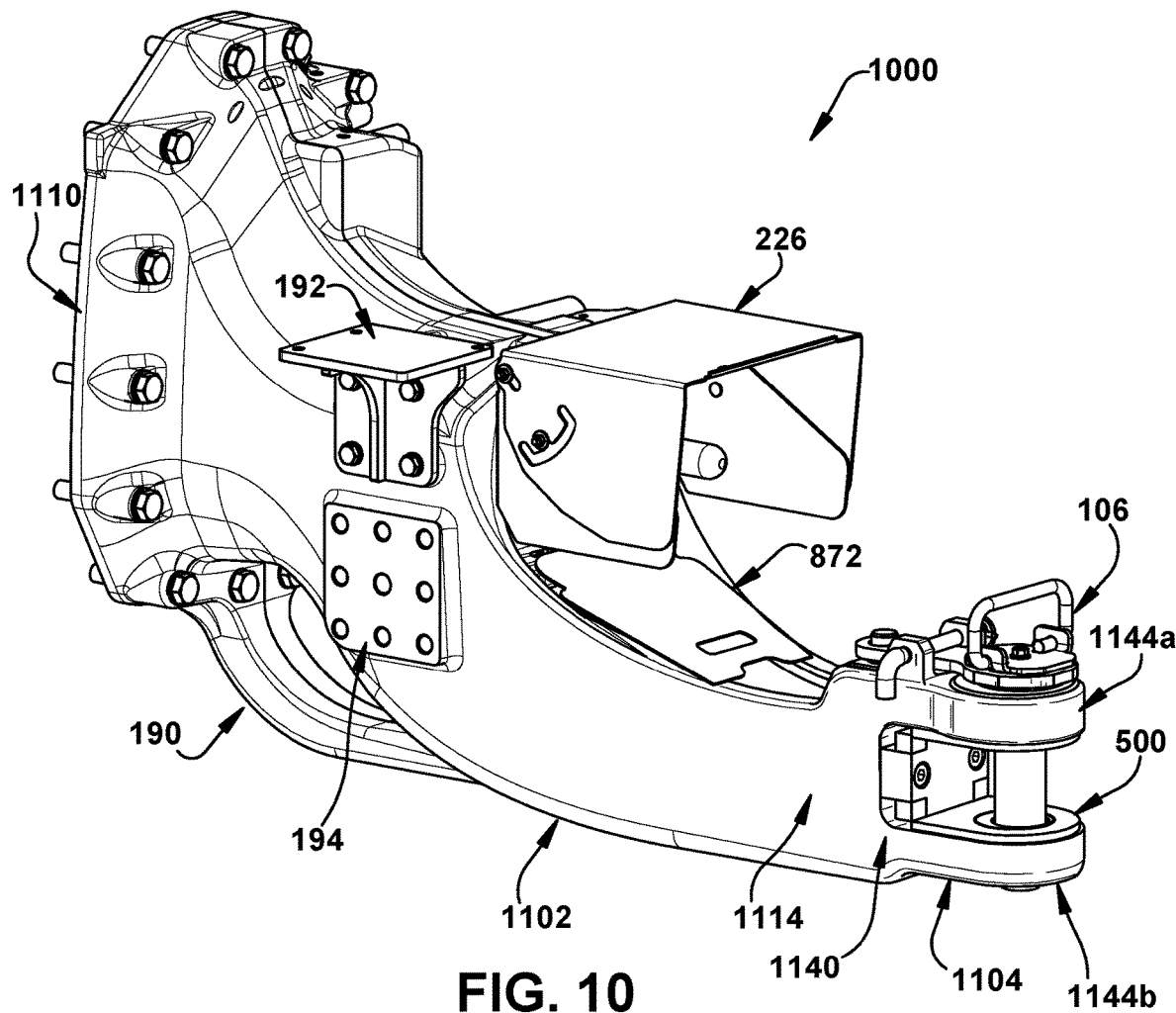
FIG. 10 is a component diagram illustrating another example implementation of an implement attachment assembly in accordance with this disclosure.

In this implementation 100, the coupling device 104 can be connected to the member 102 at the second end 114. In some implementations, the coupling device 104 can be formed integral with the member 102 at the second end 114, as shown in FIG. 10. In these implementations, the coupling device 104 can be formed integral with member 102 by combining the coupling device 104 and member 102 into one casting, for example. As an example, forming the coupling device 104 integral with the member 102 may be able to reduce the number of parts used during manufacture, which may also reduce the cost of manufacture. In other implementations, the coupling device (e.g., 104) can be non-selectably fixed to the member, such as by welding, soldering, using adhesive, or the like.

In other implementations, the coupling device 104 is a separate, distinct component that can be removably attached to the member 102 at the second end 114 using any suitable fastening means, such as bolts. As an example, in the implementation shown in FIG. 1, the coupling device 104 can be removably attached/detached to the member 102 at the second end 114, for example, using fasteners, such as a plurality of bolts (e.g., or other types of fasteners and/or couplers suitable for this implementation). As an example, having a selectably attachable coupling device 104 may allow for substitution and/or replacement of the coupling device 104, such as for maintenance or replacement to/of the coupling device 104 and/or in the event a different/alternate coupling device 104 is utilized.

Figure 3:
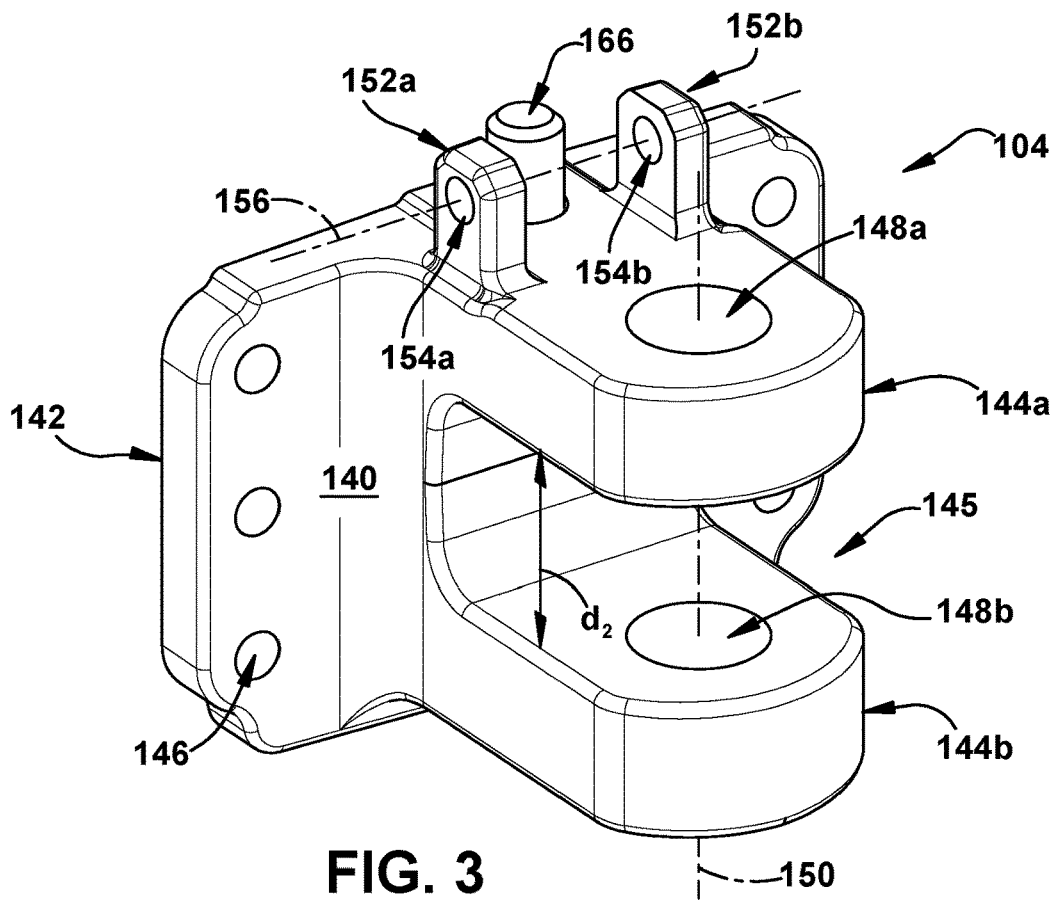
FIG. 3 is a component diagram illustrating an example implementation of a coupling device for use in the implement attachment assembly in accordance with this disclosure.

FIG. 3 is a component diagram illustrating one implementation of a coupling device 104, such as a clevis, which can be used in the implement attachment assembly 100 of FIGS. 1 and 2. The coupling device 104 can comprise a body 140, the body 140 comprising an engagement surface 142 on one side and a pair of arms 144a, 144b on the opposite side. The engagement surface 142 can be used to interface with the second end 114, for example, at the interface 115 for connection to the member 102. The engagement surface 142 can be any suitable size and shape that permits the coupling device 104 to appropriately interface with the member 102 at the second end 114. In this implementation, the engagement surface 142 can comprise a smooth substantially planar surface that is configured to engage with a complementary, smooth planar surface of the interface 115 at the second end 114 of the member 102. In this way, for example, the coupling device 104 can be operably disposed flush with the member 102 at the second end 114. In other implementations, the respective coupled surfaces (e.g., 142, 115) may comprise complementary ridges and valleys (e.g., or similar non-flat features) that allow the surfaces to couple merely in one particular arrangement. In some implementations, the engagement surface 142 can include one or more holes 146 for receiving fasteners, such as bolts, to secure the coupling device 104 to the member 102.

In this implementation, the coupling device 104 can comprise a first arm 144a and a second arm 144b, which respectively extend from the body 140 and form a pair of arms 144. In some implementations, the arms 144a, 144b extend from the body 140 in-parallel and are separated from each other by a distance $d_2$ along the length of the arms 144*a*, 144*b* forming a gap 145, or space, between the pair of arms 144*a*, 144*b*. The first arm 144*a* includes a bore 148*a* which is aligned with a bore 148*b* on the second arm 144*b* to form a pair of bores 148. The bores 148 comprise a size and shape that is configured to slidably receive a pin 106. Thus, the bores 148 define a vertical pin insertion axis 150 which is parallel to the member vertical axis 118 (e.g., and substantially orthogonal to the arms 144). However, one skilled in the art would appreciate that in alternative implementations the bores 148*a*, 148*b* may define a horizontal pin insertion axis running orthogonal to the member vertical axis 118.

In one aspect, a coupling device 104 can comprise different dimensions with bores 148 having different sized diameters, shapes, and disposition within the arms 144. For example, a Category 6 clevis has a larger diameter bore 148 than a Category 5 clevis. The diameter of the bore 148 can determine the size of a pin 106 which can be received. In this way, the implement attachment assembly 100 can be compatible with a variety of coupling devices 104 such as, for example, Category 5 and Category 6 (e.g., and other) clevis devices.

In some implementations, the coupling device 104 can comprise a pair of tabs 152 positioned on top of the coupling device 104. In some implementations, the tabs 152 can be disposed on top of the coupling device 104, such as proximate (e.g., or on) the first arm 144*a*, and can extend vertically from the coupling device 104 in the direction of the member vertical axis 118. Each tab 152*a*, 152*b* can include an opening 154*a*, 154*b*. The openings 154*a*, 154*b* can be aligned with each other and form a pair of tab openings 154. A cross pin insertion axis 156 can extend through the pair of tab openings 154 orthogonal to the direction of the member vertical axis 118 and to the vertical pin insertion axis 150. As will be described in more detail below with reference to FIGS. 7A and 7B, a cross pin 158 can be removably inserted between the tabs 152 and extend through the openings 154*a*, 154*b* in the tabs 152.

The coupling device 104 can further comprise a dowel pin 166, or locking pin. As shown in FIGS. 2 and 7B, the dowel pin 166 can be configured to be insertable into a receiving cavity 168 disposed in the top of the coupling device 104. The dowel pin 166 can be retained in the receiving cavity 168 via a press fit or interference fit. Alternatively, the dowel pin 166 can be retained in the receiving cavity 168 using another retaining means, such as welding, soldering, adhesive, etc. The purpose of the dowel pin 166 will be described in more detail below in relation to the pin 106.

Figure 4:
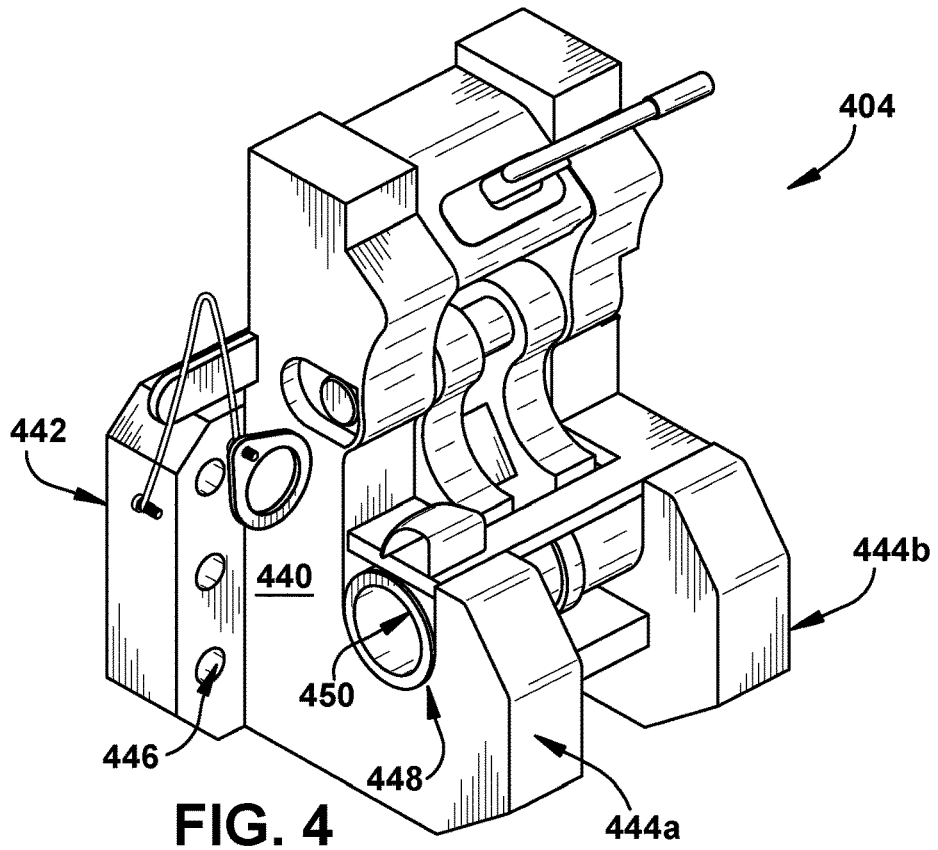
FIG. 4 is a component diagram illustrating another example implementation of a coupling device for use in the implement attachment assembly in accordance with this disclosure

FIG. 4 is a component diagram illustrating an alternate implementation of a coupling device 404 that can be operably connected to the member 102 in an implement attachment assembly 100 according to this disclosure. In this implementation, the coupling device 404 can comprise a body 440, the body 440 comprising an engagement surface 442 on one side and a pair of arms 444*a* and 444*b* on the opposite side. The engagement surface 442 can be used to interface with the second end 114 such as, for example, at the interface 115 for connection to the member 102. The engagement surface 442 can be any suitable size and shape that permits the coupling device 404 to interface with the member 102 at the second end 114. In this embodiment, the engagement surface 442 is to appropriately couple the coupling device 404 with the member 102 at the second end 114. In some implementations, the engagement surface 442 can include one or more holes 446 for receiving fasteners, such as bolts, to secure the coupling device 404 to the member 102.

In this implementation, the coupling device 404 can comprise a first arm 444*a* and a second arm 444*b* which extend parallel to each other and form a pair of arms 444. The first arm 444*a* and second arm 444*b* define an exposed channel 448 which accommodates a hollow cylindrical sleeve 450 for attachment to an implement (not shown). As an example, this type of coupling device 404 may be used with an agricultural or construction scraper. That is, for example, the coupling device 404 is configured to attach to a work vehicle, such as a tractor, to couple the vehicle to a scraper implement.

Figure 5A:
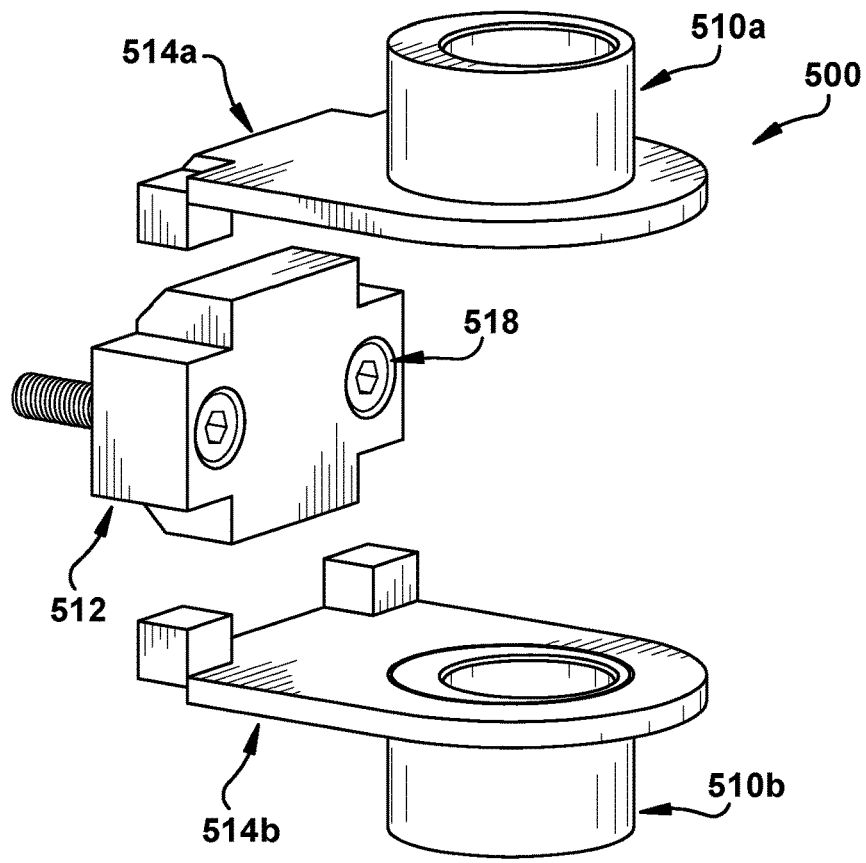
FIGS. 5A and 5B are component diagrams illustrating a set of components for use with a coupling device used in the implement attachment assembly in accordance with this disclosure.
Figure 5B:
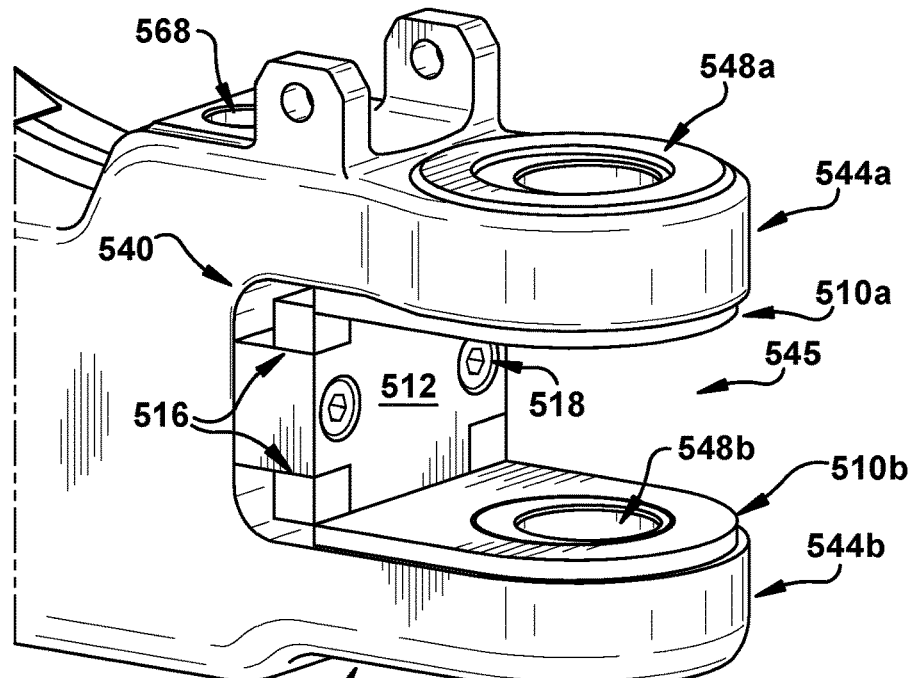

FIGS. 5A and 5B are component diagrams illustrating an alternate implementation of a coupling device 504. In this implementation, a set of wear (e.g., sacrificial) bodies 500 can be used with the coupling device 504. In some implementations, the set of wear bodies 500 can comprise a pair of bushings 510*a*, 510*b* and a wear plate 512. The bushings 510*a*, 510*b* can comprise a size and shape so as to be mountable in the bores 548*a*, 548*b* of the coupling device 504. For example, in some implementations, the set of wear bodies 500 can comprise a pair of cylindrical bushings 510*a*, 510*b* which are mountable in the bores 548*a*, 548*b* of the coupling device 504. In these implementations, the first cylindrical bushing 510*a* can be mounted in the bore 548*a* of the first arm 544*a* and the second cylindrical bushing 510*b* can be mounted in the bore 548*b* of the second arm 544*b*. Each bushing 510*a*, 510*b* comprises an outer diameter that is smaller than the inner diameter of the pair of bores 548*a*, 548*b* and an inner diameter larger than the outer diameter of a pin (e.g., 106) that may be operably used with the coupling device 504. For example, this may permit the bushings 510*a*, 510*b* to operably, slidably receive a pin when it is inserted into the bores 548*a*, 548*b*. For example, positioning the bushings 510*a*, 510*b* between the coupling device 504 and a pin results in the bushings 510*a*, 510*b* receiving potential wear from pin-rotation, thereby mitigating wear to the coupling device 504.

In this implementation, each bushing 510*a*, 510*b* can comprise a base 514*a*, 514*b* at one end. Each base 514*a*, 514*b* comprises a mechanical feature that can interact and cooperate with a complementary mechanical feature on the wear plate 512 to form an interlocking joint 516, such as a finger joint. In some implementations, the base 514*a* can be configured to form an interlocking joint 516 with the wear plate 512 when the first bushing 510*a* engages the wear plate 512. The base 514*b* can be configured to form an interlocking joint 516 with the wear plate 512 when the second bushing 510*b* engages the wear plate 512.

In this implementation, the wear plate 512 can be mountable to the coupling device 504. In some implementations, the wear plate 512 can include one more bores 518 for receiving fasteners, such as bolts, to fixedly attach the wear plate 512 to the coupling device 504. In this implementation, the wear plate 512 is mounted to the coupling device 504 using a pair of bolts, which may allow removal of the wear plate 512 from the coupling device 504 to repair or replace the wear plate 512. In some implementations, the wear plate 512 can be mounted to the coupling device body 540 with the wear plate 512 disposed in the gap 545 between the first and second arms 544*a*, 544*b* and, with the wear plate 512 disposed between, and in physical engagement with, the first and second bushings 510*a*, 510*b*.

In this implementation, the wear plate 512 cooperates with the base 514*a*, 514*b* portions of the first and second bushings 510*a*, 510*b* to form interlocking joints 516, such as finger joints. As an example, by engaging the bushings 510*a*, 510*b*, the wear plate 512 may provide mechanical support to the first and second bushings 510a, 510b in the bores 548a, 548b to mitigate wear to the coupling device 504. In some implementations, the coupling device 1104 is formed integral with the member 1102 (see FIG. 10) and, in this instance, the coupling device 1104 can be fitted with the set of wear bodies 500 because the wear bodies 510a, 510b, 512 can be removed and replaced if damaged and/or worn, while the coupling device 1104 is permanently connected to the member 1102 and incapable of selective removal and replacement.

Figure 6A:
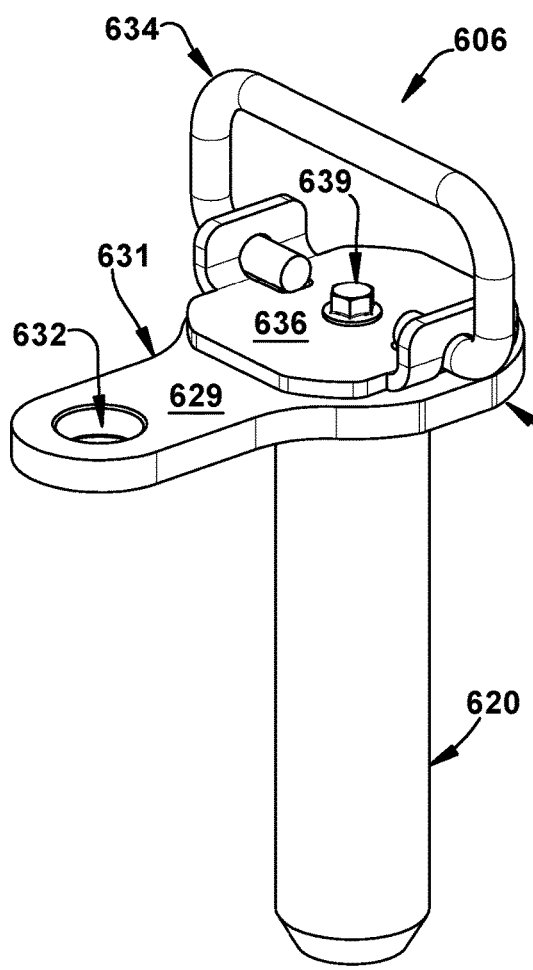
FIGS. 6A and 6B are component diagrams illustrating an example implementation of a pin, shown assembled and disassembled, for use with the implement attachment assembly in accordance with this disclosure.
Figure 6B:
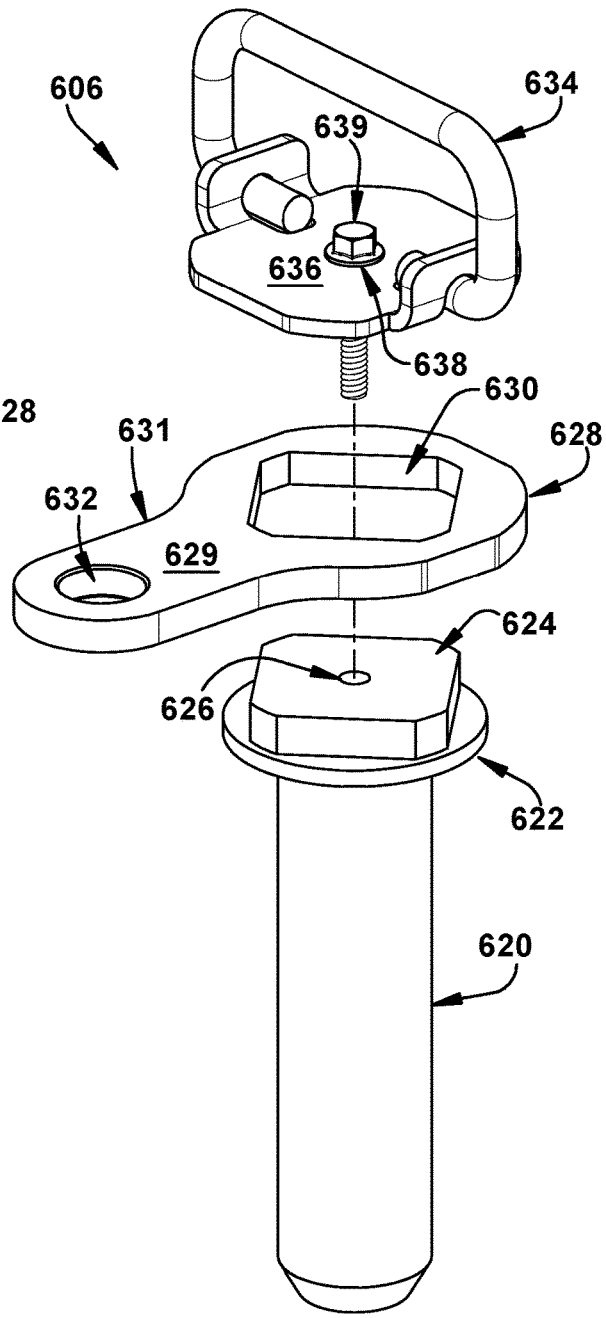

FIGS. 6A and 6B are component diagrams illustrating an example implementation of a pin 606 (e.g., pin 106 of FIG. 1), shown assembled and disassembled, for use in the implement attachment assembly (e.g., 100 of FIG. 1). The pin 606 is configured to be slidably inserted into the bores (e.g., 148a, 148b) of a coupling device (e.g., 104). In some implementations, the pin 606 can comprise multiple elements that are selectably fastened together, for example, by using one or more fasteners. In other implementations, the pin 606 can comprise multiple elements that are permanently fastened together to form a unitary piece by welding, soldering, or using an adhesive.

The pin 606 can comprise a cylindrical shaft 620 which can be inserted downwardly through the bores of a coupling device along a vertical pin insertion axis (e.g., 150). The pin 606 can include a collar 622 at a first end of the shaft 620. The collar 622 comprises a bottom side which can engage the top surface of a first arm (e.g., 144a) when the pin 606 is inserted into the bores. As an example, this interaction between the collar 622 and the first arm can mitigate the pin 606 traversing completely through the pair of bores during insertion. In this implementation, the collar 622 comprises a top side that includes a plate engagement member 624. The pin 606 can have a pin bore 626 that extends downwardly into the pin 606 through the plate engagement member 624 and collar 622 along a longitudinal axis of the pin 606.

The plate engagement member 624 can be selectively mated with a plate 628 by inserting the plate engagement member 624 into a complimentary receiving slot 630 in the plate 628 with a bottom surface of the plate 628 supported on the collar 622. Preferably, the plate engagement member 624 and receiving slot 630 cooperate to form a locking mechanism, which operably mitigates rotational movement of the pin shaft 620 relative to the plate 628, when the plate engagement member 624 is mated with the plate 628. As an example, in the implementation shown in FIGS. 6A and 6B, the plate engagement member 624 comprises a raised platform having a rectangular shape which is selectably inserted into a complimentary rectangular receiving slot 630 in the plate 628. Interaction between the walls of the plate engagement member 624 and the walls of the receiving slot 630 can mitigate rotational movement of the pin shaft 620 relative to the plate 628. It is known in the art that a pin is subject to wear during operation, such as due to rotation. In this implementation, interaction between the plate engagement member 624 and the plate 628 reduces rotational movement of the pin 606, thereby reducing wear of the pin 606.

The plate 628 can comprise a body 629, the body 629 comprising the receiving slot 630 at one end and a hole 632 at another end for a reason that will be described in more detail below. In some implementations, the body 629 can be shaped (e.g., like a bowling pin or other suitable shape) with a narrower neck portion 631 extending from a wider portion of the body 629. The wider portion of the body 629 can include the receiving slot 630 and the narrower neck portion 631 can include the hole 632.

The pin 606 can comprise a mounting plate 636. The mounting plate 636 can include a mounting plate bore 638 centrally located in the mounting plate 636. Optionally, in some implementations the pin 606 can further comprise a handle 634 attached to the mounting plate 636.

As one example, the pin 606 can be selectably assembled by positioning the mounting plate 636 over the mated combination of the plate engagement member 624 and plate 628 with the mounting plate bore 638 aligned with the pin bore 626. In this example, a fastener 639, such as a screw or bolt or the like, can be inserted through the mounting plate bore 638 and into the pin bore 626 to fixedly secure the assembled pin 606 (e.g., in a threaded engagement).

As an example, the pin assembly may advantageously allow a user to disassemble the pin assembly, and rotate the cylindrical shaft 620 so that a new surface of the cylindrical shaft 620 is subject to physical contact with the coupling device and any attached implement. In this manner, the pin assembly can help increase the life of the pin 606, by allowing rotation of the pin 606 by the user to change the surface of the pin 606 and, in particular the pin shaft 620, subject to wear.

Figure 7A:
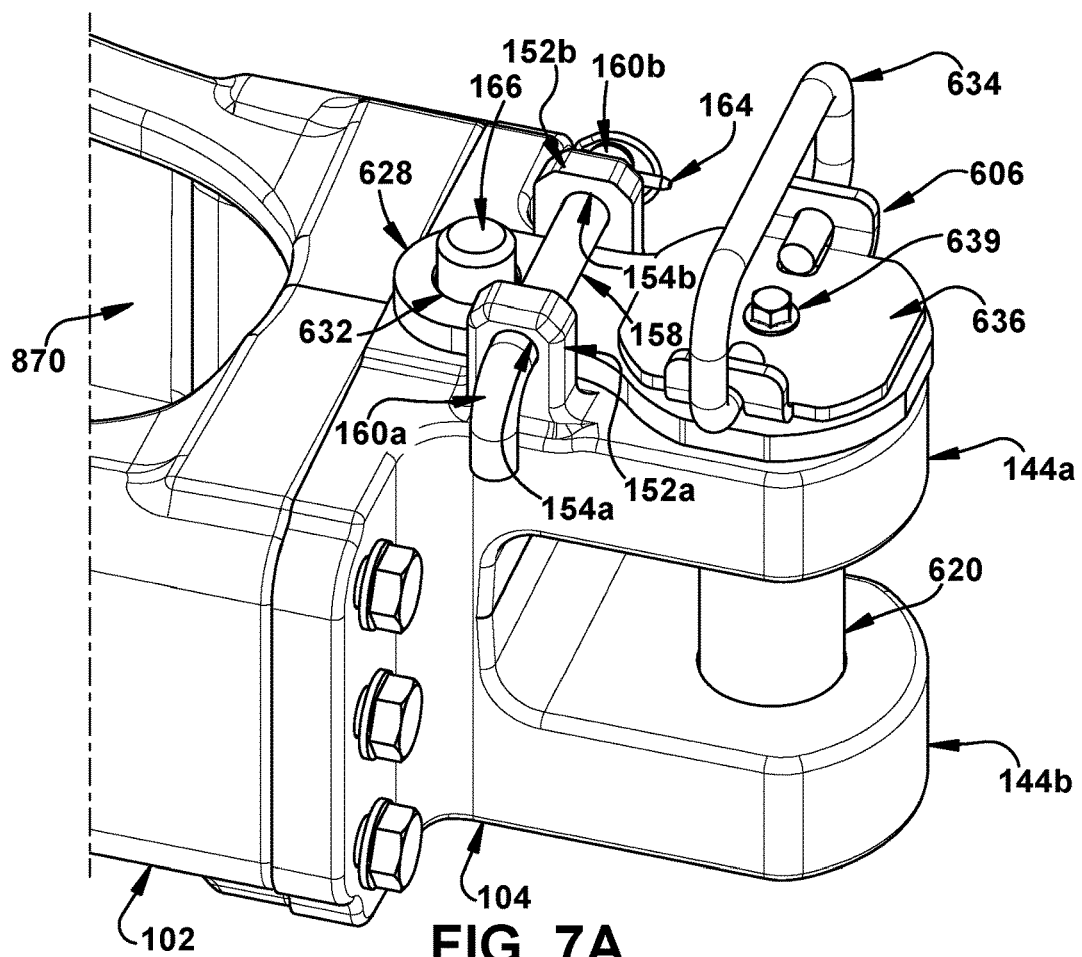
FIGS. 7A and 7B are component diagrams illustrating an implementation of one or more portions of one or more components described herein, in accordance with this disclosure.
Figure 7B:
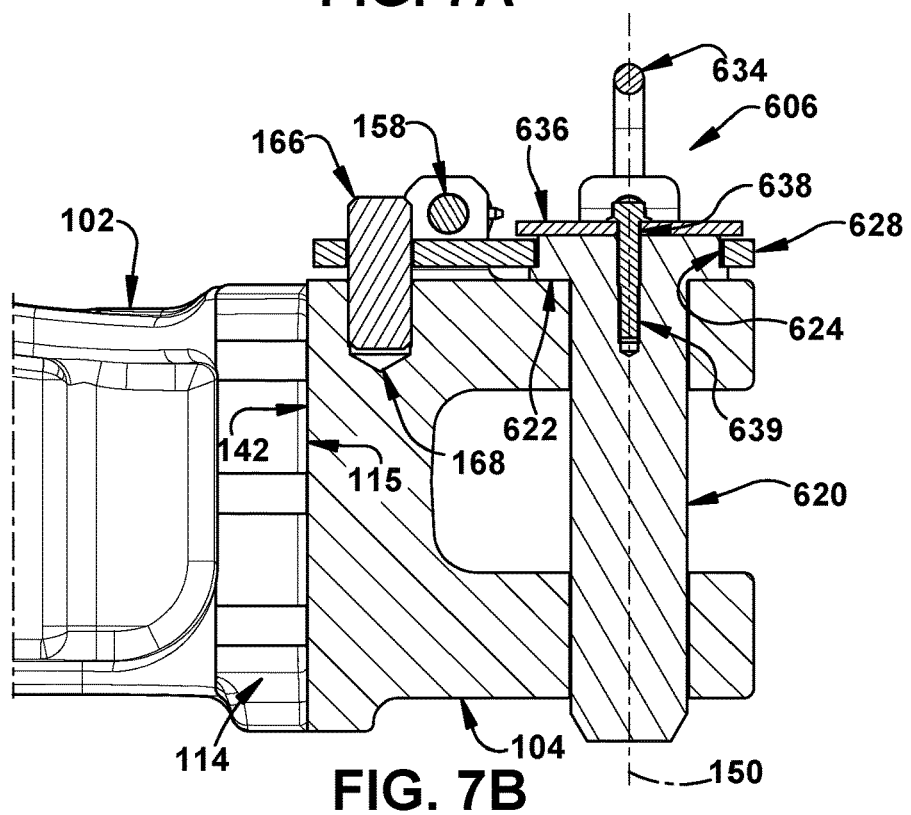

FIGS. 7A and 7B are component diagrams illustrating one example implementation of the pin 606 from FIGS. 6A and 6B, in use. In this implementation, the pin 606 is shown inserted into a coupling device 104 and fixedly engaged with the coupling device 104. In this implementation, the pin 606 is inserted to extend downwardly through the bores 148a and 148b of the coupling device 104 along the vertical pin insertion axis 150. Further, the plate 628 is oriented with the narrower neck portion 631 of the plate body 629 extending in the direction of the member 102 and disposed between the tabs 152a and 152b.

In some implementations, a cross pin 158 can be inserted in, and extend through, the tab openings 154a and 154b. The cross pin 158 can comprise a bent, L-shaped body or a straight, linear body. In this implementation, the cross pin 158 comprises a bent, L-shaped body comprising a first arm 160a and a second arm 160b which are generally disposed at right angles with respect to each other. As an example, in operation, the second arm 160b can extend out from one of the tab openings 154b, and the second arm 160b can have a hole 162. In other implementations, the cross pin 158 can comprise a generally straight, linear body with one end extending outwardly of one of the tabs 154b and including a hole 162. In both cases, the cross pin 158 can be releasably retained in place in the openings 154 by removably inserting a retaining device 164, such as a quick-lock pin with grasping ring, a roll pin, or a spring pin, through the hole 162.

In this implementation, the cross pin 158 includes a retaining device 164 (e.g., cotter pin or the like) to hold the cross pin 158 in place between the tabs 154a and 154b. The cross pin 158 mitigates movement of the pin 606 vertically, such as for removal from the coupling device 104. In this implementation, the cross pin 158 is disposed in the tabs 154 and can mitigate upward movement of the plate 628. As an example, if the cross pin 158 is removed, the plate 628 and pin 606 can be withdrawn upwardly from the bores 148a and 148b of the coupling device 104.

In this implementation, the hole 632 on the plate 628 is positioned over the receiving cavity 168. In some implementations, a dowel pin 166 can be disposed through the hole 632 and into the receiving cavity 168. As an example, the dowel pin 166 can mitigate rotation of the pin 606 to reduce wear to the pin 606 resulting from pin-rotation. In some implementations, the tabs 154a and 154b can also assist the dowel pin 166 in mitigating rotation of the pin 606.

The implementations described above may help keep the pin 606 and coupling device 104 stationary relative to each other during operation. As an example, by mitigating rotation of the pin 606 relative to the coupling device 104, translational motion can be transferred to the pin 606. In some instances, this can be preferable as the pin 606 can be more durable, less subject to wear, and may be easier and less expensive to replace (if worn) than the coupling device 104.

Figure 8A:
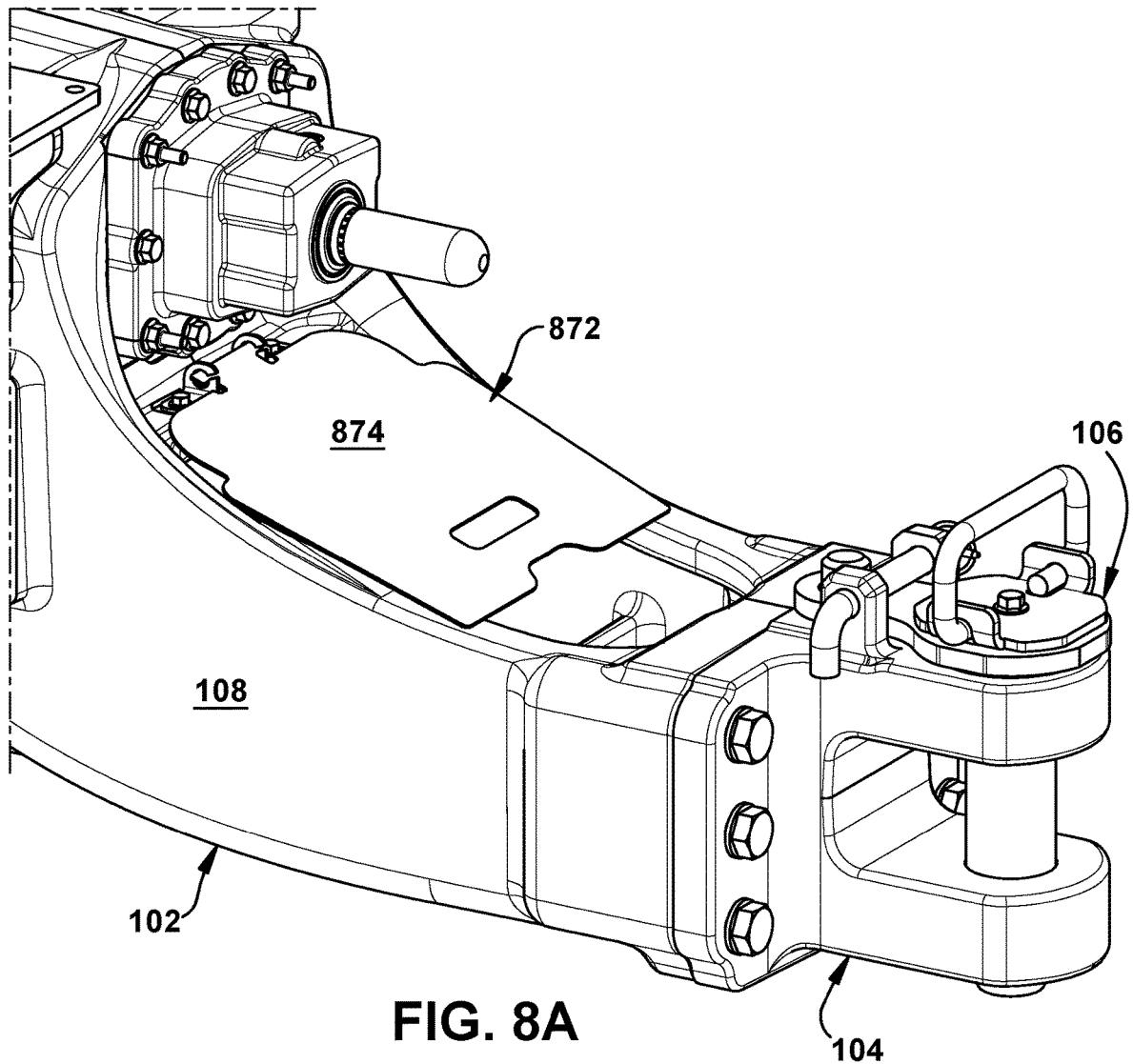
FIGS. 8A and 8B are component diagrams illustrating an example implementation of one or more portions of one or more systems described herein, in accordance with this disclosure.
Figure 8B:
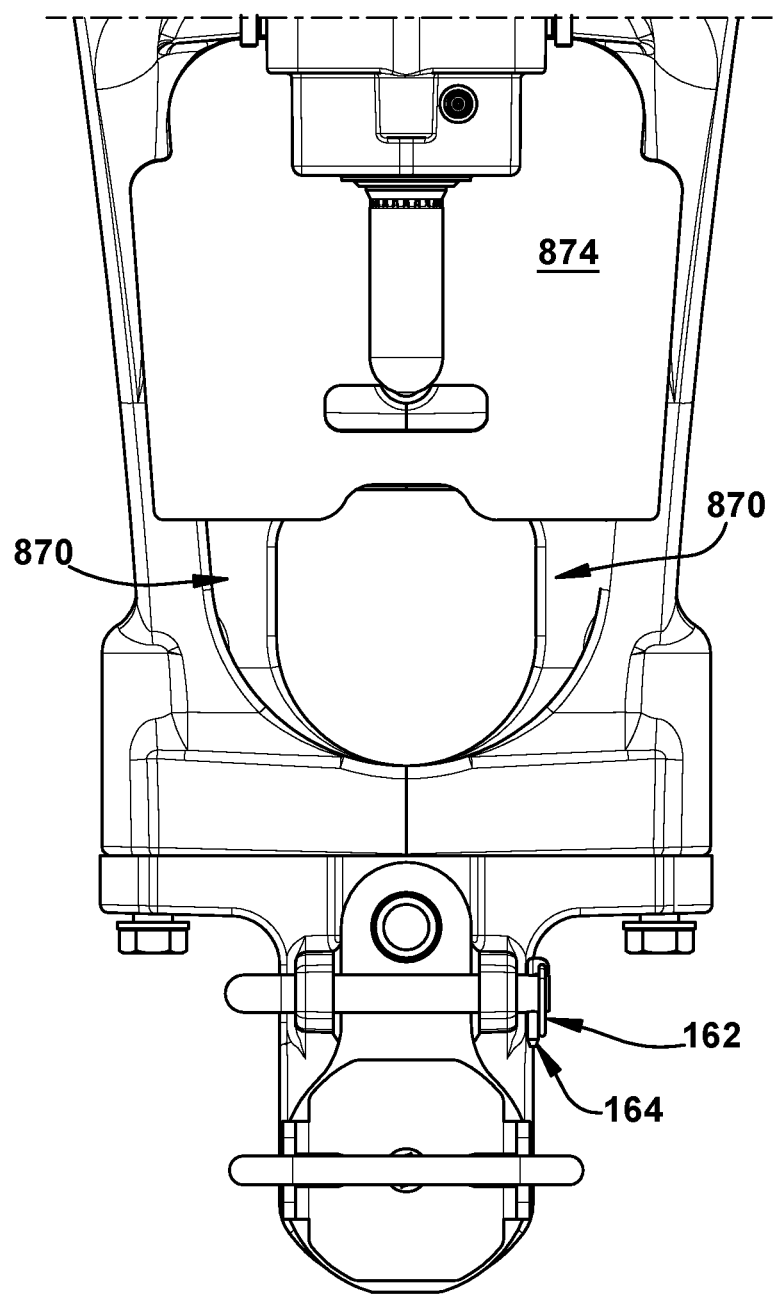

FIGS. 8A and 8B are component diagrams illustrating an example implementation of a member 102 comprising a storage container 870, for use in the implement attachment assembly (e.g. 100 of FIGS. 1 and 2). In some implementations, the member 102 comprises a storage container 870 integrated in the member 102. The storage container 870 can provide built-in internal storage space in the implement attachment assembly 100. In some implementations, the storage container 870 can comprise a closed bottom, an open bottom, or a closed bottom which can be converted to an open bottom by removal of an insert (not shown), such as a plug.

In some implementations, a storage container cover 872 can be removably attached to the member 102. As an example, the storage container cover 872 can at least partially (if not completely) cover the storage container 870 to help shelter the contents of the storage container 870 from the weather and/or to retain the contents in the storage container 870 (e.g., mitigate the potential for the contents to bounce out of the storage container 870) during use.

The storage container 870 can be generally disposed anywhere in the member 102. In this implementation, the member (102) operably accommodates a PTO shaft assembly (222) that is operably coupled with a PTO clutch assembly (220) such that PTO components occupy a first half of the member 102 that is proximate the first end 110. As a result, in this implementation, the storage container 870 is disposed in a second half of the member 102 that is proximate the second end 114.

FIGS. 9A through 9E are component diagrams illustrating example implementations of the storage container cover 872. In some implementations, the storage container cover 872 can comprise a lid 874 removably connected to a pair of brackets 876. The lid 874 can be any suitable size and shape that permits the lid 874 to cover some, or all, of the storage container 870.

In some implementations, the brackets 876 can comprise an L-shaped body having two arms. In some implementations, the brackets 876 comprise a first arm having a bore 878 for receiving a fastener, such as a bolt, to fixedly attach the bracket 876 to the member 102. The brackets 876 comprise a second arm having an internally formed open eyelet 880, for attachment to the lid 874 in a manner that will be explained in more detail below.

In some implementations, the lid 874 can comprise a pair of opposing tabs 884 which can be removably inserted into the open eyelets 880. In this implementation, the tabs 884 can be withdrawn from the open eyelets 880 as needed. As an example, a user can completely remove the lid 874 from the member 102 for reasons including, but not limited to, adding/removing material (e.g., chains, pins, etc.) to the storage container 870. As an example, a removable lid 874 can reduce any potential interference by the lid 874 when accessing contents inside the storage container 870.

FIG. 10 is a component diagram illustrating another example of an implement attachment assembly 1000. In some implementations, the coupling device 1104 is formed integral with the member 1102 at the second end 1114. In this implementation, the implement attachment assembly 1000 preferably comprises a set of wear bodies 500 to mitigate wear to the coupling device 1104. As an example, rotation of the pin 106 can cause frictional wear to the casting such as, for example, to the arms 1144a and 1144b and body 1140 of the coupling device 1104. The set of wear bodies 500, which can be removed and replaced if damaged and/or worn, mitigates frictional wear to the coupling device 1104, which is permanently connected to the member 1102 and incapable of selective removal and replacement.

FIGS. 11A and 11B are component diagrams illustrating an implement attachment assembly 100 attached to a differential case 1128. In some implementations, the implement attachment assembly can comprise optional features that are mountable to the member 102. In some implementations, the implement attachment assembly 100 can optionally comprise a selective control valve (SCV) bracket 192 on which a rear SCV (not shown) can be mounted. As an example, the SCV member bracket 192 can be removably attached to the member 102 by one or more fasteners, such as bolts.

In some implementations, the implement attachment assembly 100 can optionally comprise a weight mount 194 that can be removably attached to the member 102 by one or more fasteners, such as bolts. As an example, the weight mount 194 can be used for attaching weights to the implement attachment assembly 100 to ballast a work vehicle, such as a tractor. In this implementation, the weight mount 194 adds flexibility to the implement attachment assembly 100 because a user can add or remove weights based on the operational requirements. In some implementations, the weight mount 194 can be incorporated in other types of mounting, such as tile plow mounting.

In some implementations, the implement attachment assembly 100 can optionally comprise an electric bracket 196 and a clutch brake valve 198 operably connected to the member 102. Although not shown, the member 102 can house internal oil lines for the clutch brake valve 198.

Figure 12A:
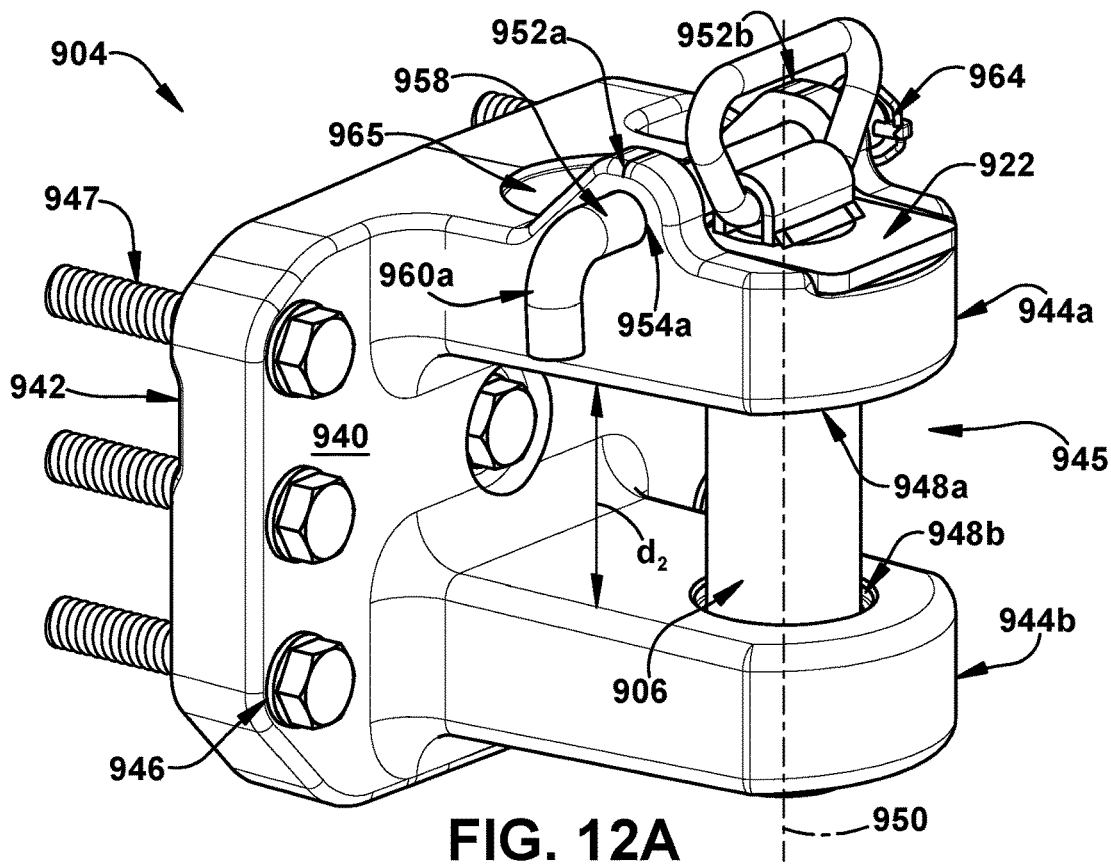
FIGS. 12A and 12B are component diagrams illustrating another example implementation of a coupling device for use in the implement attachment assembly in accordance with this disclosure.
Figure 12B:
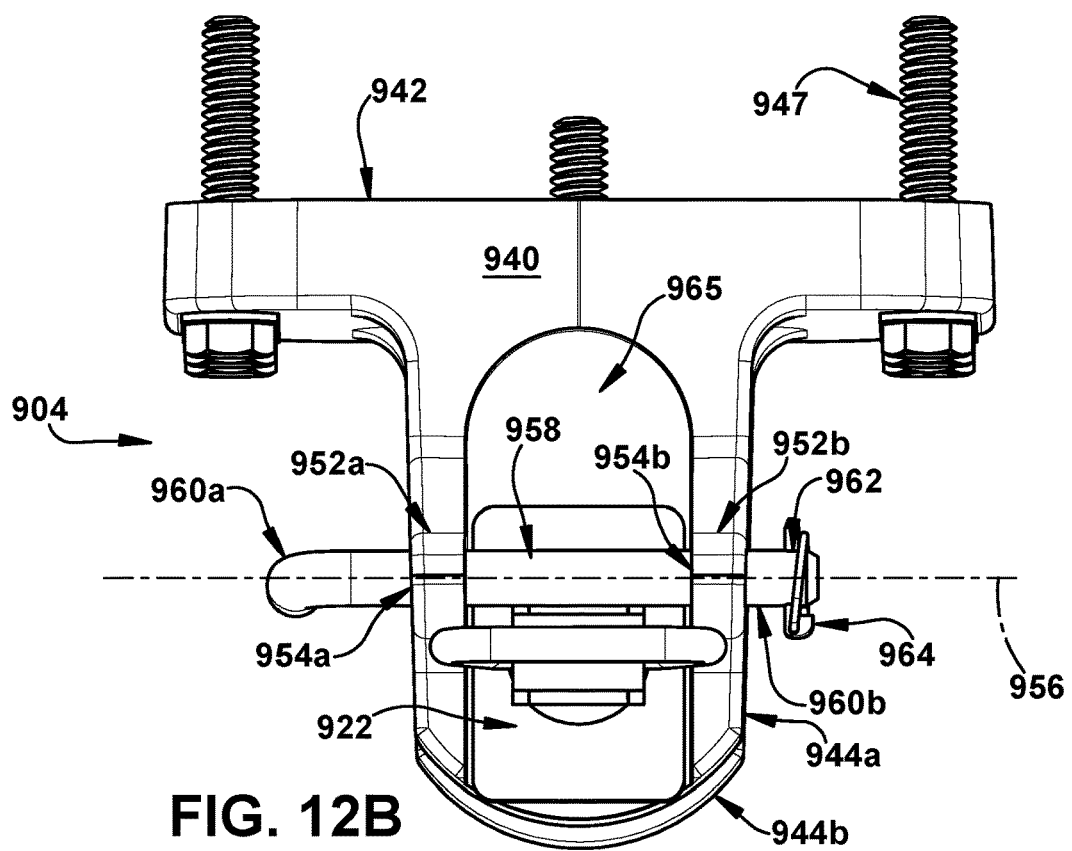

FIGS. 12A and 12B are component diagrams illustrating another implementation of a coupling device 904, such as a clevis, for use in an implement attachment assembly (e.g., 100 of FIGS. 1 and 2). The coupling device 904 can comprise a body 940, the body 940 comprising an engagement surface 942 on one side and a pair of arms 944a, 944b on the opposite side. The engagement surface 942 can be used to interface with the second end 114, for example, at the second interface 115 for connection to the member 102. The engagement surface 942 can be any suitable size and shape that permits the coupling device 904 to appropriately interface with the member 102 at the second end 114. In this implementation, the engagement surface 942 can comprise a smooth substantially planar surface that is configured to engage with a complementary, smooth planar surface of the interface 115 at the second end 114 of the member 102. In this way, for example, the coupling device 904 can be operably disposed flush with the member 102 at the second end 114. In other implementations, the respective coupled surfaces (e.g., 942, 115) may comprise complementary ridges and valleys (e.g., or similar non-flat features) that allow the surfaces to couple merely in one particular arrangement. In some implementations, the engagement surface 942 can include one or more holes 946 for receiving fasteners 947, such as bolts, to secure the coupling device 904 to the member 102.

In this implementation, the coupling device 904 can comprise a first arm 944a and a second arm 944b, which respectively extend from the body 940 and form a pair of arms 944. In some implementations, the arms 944a, 944b extend from the body 940 in a substantially parallel arrangement, or resulting in a substantially parallel disposition, and are separated from each other by a distance $d_2$ at least at one end (e.g., or along the length) of the arms 944a, 944b forming a gap 945, or space, between the pair of arms 944a, 944b. The first arm 944a includes a bore 948a which is aligned with a bore 948b on the second arm 944b to form a pair of bores 948. The bores 948 comprise a size and shape that is configured to receive a pin 906 therethrough. Together, the bores 948 define a vertical pin insertion axis 950, which, for example, can be substantially parallel to the member vertical axis 118 (e.g., and substantially orthogonal to the arms 944). However, one skilled in the art would appreciate that in alternative implementations the bores 948a, 948b may define a horizontal pin insertion axis running orthogonal to the member vertical axis 118.

In one aspect, a coupling device 904 can comprise different dimensions with bores 948 having different sized diameters, shapes, and disposition within the arms 944. For example, a Category 6 clevis has a larger diameter bore 948 than a Category 5 clevis. The diameter of the bore 948 can determine the size of a pin 906 which can be received. In this way, the implement attachment assembly (e.g., 100) can be compatible with a variety of coupling devices 904 such as, for example, Category 5 and Category 6 (e.g., and other) clevis devices.

In some implementations, the coupling device 904 can further comprise a recess 965 disposed at a top portion of the coupling device 904. In some implementations, the recess 965 can be positioned on the top portion of the coupling device, such as proximate (e.g., or on) the first arm 944a, and can comprise a size and shape configured to accommodate at least a portion of the pin 906, for example, the collar 922. In some implementations, interaction between the collar 922 of the pin 906 and the walls of the recess 965 can mitigate rotational movement of the pin 906, thereby reducing wear of the pin 906.

In some implementations, the coupling device 904 can comprise a pair of tabs 952 (e.g., ears) disposed at a top portion of the coupling device 904. In some implementations, the tabs 952 can be disposed proximate (e.g., or on) the first arm 944a, and can extend vertically from the coupling device 904 in the direction of the member vertical axis 118 when the coupling device 904 is attached to the member 102. Respective tabs 952a, 952b can comprise an opening 954a, 954b. As an example, the openings 954a, 954b can be appropriately aligned with each other to form a pair of tab openings 954. A cross pin insertion axis 956 can extend through the pair of tab openings 954, for example, substantially orthogonal to the member vertical axis 118 and the vertical pin insertion axis 950. The cross pin 958 can be removably, operably inserted between the tabs 952 and extend through the openings 954a, 954b in the tabs 952a, 952b.

In some implementations, a cross pin 958 can be inserted into the openings 954a, 954b, and extend through the tab openings 954a and 954b. In some implementations, the cross pin 958 can comprise a bent, L-shaped body or a straight, linear body. In this implementation, the cross pin 958 comprises a bent, L-shaped body comprising a first arm 960a and a second arm 960b which are generally disposed at an obtuse angle with respect to each other. As an example, in operation, the second arm 960b can extend out from one of the tab openings 954b, and the second arm 960b can have a hole 962. In other implementations, the cross pin 958 can comprise a generally straight, linear body with one end extending outwardly of one of the tabs 954b and including a hole 962. In both cases, the cross pin 958 can be releasably retained in place in the openings 954 by removably inserting a retaining device 964, such as a quick-lock pin with grasping ring, a roll pin, or a spring pin, through the hole 962.

In this implementation, the cross pin 958 includes a retaining device 964 (e.g., cotter pin or the like) to hold the cross pin 958 in place between the tabs 954a and 954b. The cross pin 958 mitigates movement of the pin 906 vertically, such as for removal from the coupling device 904. In this implementation, the cross pin 958 is disposed in the tabs 954 and can mitigate upward movement of the pin 906 by engaging the collar 922 of the pin 906. As an example, if the cross pin 958 is removed, the pin 906 can be withdrawn upwardly from the bores 948a and 948b of the coupling device 904.

Figure 13:
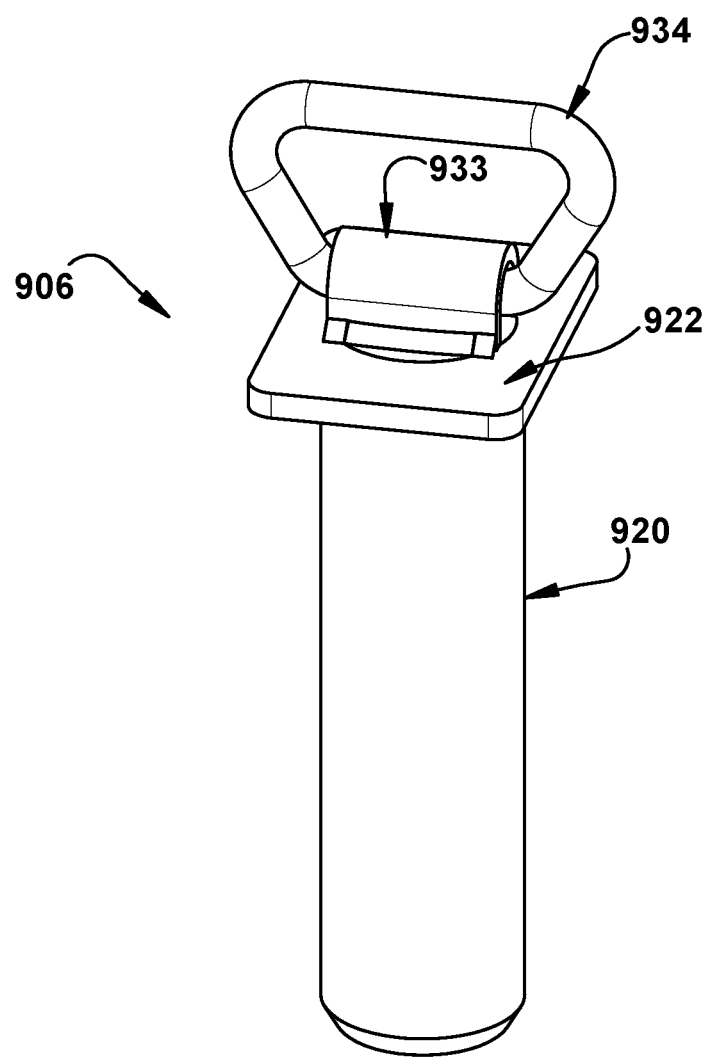
FIG. 13 is a component diagram illustrating another example implementation of a pin for use with the implement attachment assembly in accordance with this disclosure.

FIG. 13 is a component diagram illustrating another example implementation of a pin 906 (e.g., pin 106 of FIG. 1) for use in the implement attachment assembly (e.g., 100 of FIG. 1). The pin 906 is configured to be removably inserted into the bores (e.g., 948a, 948b) of a coupling device (e.g., 904). In some implementations, the pin 906 can comprise multiple elements that are selectably fastened together, for example, by using one or more fasteners. In other implementations, the pin 906 can comprise multiple elements that are permanently fastened together to form a unitary piece by welding, soldering, or using an adhesive.

The pin 906 can comprise a cylindrical shaft 920 which can be inserted downwardly through the bores of a coupling device along a vertical pin insertion axis (e.g., 950). The pin 906 can comprise a collar 922 at a first end of the shaft 920. The collar 922 can have a size and shape that permits at least a portion of the collar 922 to be received in a complimentary recess (e.g., 965) of a coupling device (e.g., 904) when the pin 906 is inserted into the bores (e.g., 948a, 948b). In some implementations, a bottom surface of the collar 922 can be supported by a surface of the recess when the pin is inserted into the bores. As an example, this interaction between the collar 922 and the recess of the coupling device can mitigate the pin 906 traversing completely through the pair of bores during insertion.

In some implementations, the side walls of the collar 922 can be configured to engage the side walls defining the recess (e.g., 965 in FIGS. 12A and 12B) when the pin 906 is inserted into the bores (e.g., 948a, 948b). As one example, the collar 922 and the walls of the recess cooperate to form a locking mechanism, which operably mitigates rotational movement of the pin 906 relative to the coupling device (e.g., 904). Often, a pin used to couple a hitch and trailer can be subject to wear during operation, such as due to rotation. The example device described herein can mitigate such wear, in some implementations, where the interaction between the walls of the collar 922 and the walls of the recess are configured to reduce rotational movement of the pin 906, thereby reducing wear to the pin 906.

Optionally, in some implementations the pin 906 can further comprise a handle 934 attached to a top side of the collar 922 via a retaining bracket 933. The retaining bracket 933 may secure the handle 934 to the collar 922 while still permitting movement of the handle 934 relative to the collar 922. For example, the handle 934 can be used to facilitate insertion or removal of the pin from an operable arrangement.

Overall, the implement attachment assembly 100 offers multiple benefits as it relates to the optional inclusion of a PTO (e.g., a rear PTO). These advantages include simple and compact implementation and mounting of the PTO clutch assembly 220 and PTO shaft assembly 222. Other advantages include easier hydraulic oil management of the PTO and easier service of the PTO clutch assembly 220 and PTO shaft assembly 222 because the associated parts are more accessible. As an example, an integrated implement attachment assembly 100 reduces the number of external oil lines because internal oil lines and clutch brake valve 198 features are included in the member 102 casting. In the implementations in which the member 102 operably accommodates the PTO shaft assembly 222 that is operably coupled to the PTO clutch assembly 220, a rear PTO casting 224 can be mounted to the member 102 with fasteners, such as bolts, and a PTO shield 226 can be mounted on the rear PTO casting 224.

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. An implement attachment assembly for a work vehicle, the implement attachment assembly comprising:
    a member having a single, monolithic body extending longitudinally between a first end and a second end, the first end comprising a central axis disposed at a first height $h_1$ relative to a member vertical axis and the second end comprising a central axis disposed at a second height $h_2$ relative to the member vertical axis, wherein the member body is hollow;
    wherein the first end central axis is operably disposed at a different height than the second end central axis, and
    wherein the first end is configured to operably connect to the work vehicle and the second end is configured to operably connect to a coupling device.

2. The implement attachment assembly of claim 1, wherein the first height $h_1$ is greater than the second height $h_2$ and the slope of the body tends to decline moving in the longitudinal direction from the first end to the second end.

3. The implement attachment assembly of claim 1, wherein the member operably accommodates a PTO shaft assembly that is operably coupled with a PTO clutch assembly.

4. The implement attachment assembly of claim 1, wherein the member comprises a tie-down loop fixedly engaged at the bottom of the member.

5. The implement attachment assembly of claim 1, wherein the coupling device is formed integral with the member.

6. The implement attachment assembly of claim 1, wherein the coupling device is a clevis comprising:
    a clevis body;
    a first arm extending from the clevis body, the first arm having a bore; and
    a second arm extending from the clevis body, the second arm having a bore,
    wherein the respective bores are aligned with each other and define a pin insertion axis.

7. The implement attachment assembly of claim 6, further comprising a set of wear bodies removably mounted to the clevis to operably provide a physical barrier between the clevis and an inserted pin, the set of wear bodies comprising:
    a first bushing selectably mountable in the first arm bore;
    a second bushing selectably mountable in the second arm bore; and
    a wear plate which is selectably mountable to the clevis body, wherein the wear plate engages the first bushing to support the first bushing within the first arm bore, wherein the wear plate engages the second bushing to support the second bushing within the second arm bore.

8. The implement attachment assembly of claim 6, further comprising a pin which is selectably insertable into the bores along the pin insertion axis, the pin comprising:
    a shaft,
    a collar disposed at an end of the shaft, wherein the collar comprises a plate engagement member,
    a pin bore extending into a center of the pin through the plate engagement member and collar along a longitudinal axis of the pin;
    a plate comprising a body, the body comprising a receiving slot at one end and a hole at another end, the receiving slot configured to receive the plate engagement member, wherein the plate engagement member and receiving slot cooperate to operably mitigate rotational movement of the pin relative to the plate;
    a mounting plate having a mounting plate bore, the mounting plate disposed over the mated combination of the plate engagement member and the plate with the mounting plate bore aligned with the pin bore; and
    a fastener selectably insertable through the mounting plate bore and into the pin bore to fixedly assemble the pin.

9. The implement attachment assembly of claim 6, wherein the clevis further comprises:
    a pair of tabs disposed on top of the clevis body, each tab having an opening, wherein the openings are aligned with each other to define a cross pin insertion axis extending orthogonal to the direction of the member vertical axis;
    a cross pin selectably mountable in the openings;
    a receiving cavity disposed in the top of the clevis body; and
    a dowel pin which is insertable into the receiving cavity.

10. The implement attachment assembly of claim 1, wherein the member comprises an integrated storage container and a storage container cover removably attached to the member.

11. An implement attachment assembly for a work vehicle, the implement attachment assembly comprising:
    a member having a hollow body extending longitudinally between a first end and a second end, the first end comprising a central axis disposed at a first height $h_1$ relative to a member vertical axis and the second end comprising a central axis disposed at a second height $h_2$ relative to the member vertical axis,
    wherein the first height $h_1$ is greater than the second height $h_2$ and the body has a downward sloping curved surface moving in a longitudinal direction from the first end to the second end,
    wherein the first end is configured to operably connect to the work vehicle and the second end is configured to operably connect to a coupling device.

12. The implement attachment assembly of claim 11, wherein the member operably accommodates a PTO shaft assembly that is operably coupled with a PTO clutch assembly.

13. The implement attachment assembly of claim 11, wherein the member comprises a tie-down loop fixedly engaged at the bottom of the member.

14. The implement attachment assembly of claim 11, wherein the coupling device is formed integral with the member.

15. The implement attachment assembly of claim 11, wherein the coupling device is a clevis comprising:
   a clevis body;
   a first arm extending from the clevis body, the first arm having a bore; and
   a second arm extending from the clevis body, the second arm having a bore,
   wherein the respective bores are aligned with each other and define a pin insertion axis.

16. The implement attachment assembly of claim 15, further comprising a set of wear bodies removably mounted to the clevis to operably provide a physical barrier between the clevis and an inserted pin, the set of wear bodies comprising:
   a first bushing selectably mountable in the first arm bore;
   a second bushing selectably mountable in the second arm bore; and
   a wear plate which is selectably mountable to the clevis body, wherein the wear plate engages the first bushing to support the first bushing within the first arm bore, wherein the wear plate engages the second bushing to support the second bushing within the second arm bore.

17. The implement attachment assembly of claim 15, further comprising a pin which is selectably insertable into the bores along the pin insertion axis, the pin comprising:
   a shaft,
   a collar disposed at an end of the shaft, wherein the collar comprises a plate engagement member,
   a pin bore extending into a center of the pin through the plate engagement member and collar along a longitudinal axis of the pin;
   a plate comprising a body, the body comprising a receiving slot at one end and a hole at another end, the receiving slot configured to receive the plate engagement member, wherein the plate engagement member and receiving slot cooperate to operably mitigate rotational movement of the pin relative to the plate;
   a mounting plate having a mounting plate bore, the mounting plate disposed over the mated combination of the plate engagement member and the plate with the mounting plate bore aligned with the pin bore; and
   a fastener selectably insertable through the mounting plate bore and into the pin bore to fixedly assemble the pin.

18. The implement attachment assembly of claim 15, wherein the clevis further comprises:
   a pair of tabs disposed on top of the clevis body, each tab having an opening, wherein the openings are aligned with each other to define a cross pin insertion axis extending orthogonal to the direction of the member vertical axis;
   a cross pin selectably mountable in the openings;
   a receiving cavity disposed in the top of the clevis body; and
   a dowel pin which is insertable into the receiving cavity.

19. An implement attachment assembly for a work vehicle, the implement attachment assembly comprising:
   a member having a hollow body extending longitudinally between a first end and a second end, the first end comprising a central axis disposed at a first height $h_1$ relative to a member vertical axis and the second end comprising a central axis disposed at a second height $h_2$ relative to the member vertical axis,
   wherein the first end central axis is operably disposed at a different height than the second end central axis,
   wherein the member operably accommodates a PTO shaft assembly inside the hollow body of the member at the first end, the PTO shaft assembly is operably coupled with a PTO coupler engaged with a PTO clutch assembly of the work vehicle to provide power to the PTO shaft assembly, and
   wherein the first end is configured to operably connect to the work vehicle and the second end is configured to operably connect to a coupling device.

* * * * *